US012630737B2

(12) United States Patent
Jilek et al.

(10) Patent No.: US 12,630,737 B2
(45) Date of Patent: May 19, 2026

(54) RADIATION SENSITIVE ORGANOTIN COMPOSITIONS HAVING OXYGEN HETEROATOMS IN HYDROCARBYL LIGAND

(71) Applicant: Inpria Corporation, Corvallis, OR (US)

(72) Inventors: Robert E. Jilek, Philomath, OR (US); Brian J. Cardineau, Corvallis, OR (US); Lucy Su Xiao Huffman, Corvallis, OR (US); Stephen T. Meyers, Corvallis, OR (US)

(73) Assignee: Inpria Corporation, Corvallis, OR (US)

( * ) Notice: Subject to any disclaimer, the term of this patent is extended or adjusted under 35 U.S.C. 154(b) by 534 days.

(21) Appl. No.: 18/198,360

(22) Filed: May 17, 2023

(65) Prior Publication Data

US 2023/0374338 A1 Nov. 23, 2023

Related U.S. Application Data

(60) Provisional application No. 63/343,331, filed on May 18, 2022.

(51) Int. Cl.

| | |
|---|---|
| ***C08F 2/46*** | (2006.01) |
| ***C08F 2/50*** | (2006.01) |
| ***C08G 61/04*** | (2006.01) |
| ***C09D 171/00*** | (2006.01) |

(52) U.S. Cl.
CPC .................................. *C09D 171/00* (2013.01)

(58) Field of Classification Search
CPC .... C09D 171/00; C07F 7/2208; C07F 7/2224; G03F 7/0042; G03F 7/325
USPC ............... 522/162, 189, 184, 71, 1, 6; 520/1
See application file for complete search history.

(56) References Cited

U.S. PATENT DOCUMENTS

| | | | |
|---|---|---|---|
| 9,310,684 | B2 | 4/2016 | Meyers et al. |
| 10,228,618 | B2 | 3/2019 | Meyers et al. |
| 11,300,876 | B2 | 4/2022 | Jiang et al. |
| 11,498,934 | B2 | 11/2022 | Clark et al. |
| 2019/0315781 | A1 | 10/2019 | Edson et al. |
| 2020/0241413 | A1 | 7/2020 | Clark et al. |
| 2020/0326627 | A1 | 10/2020 | Jiang et al. |
| 2021/0271170 | A1 | 9/2021 | Telecky et al. |
| 2022/0064192 | A1 | 3/2022 | Edson et al. |

FOREIGN PATENT DOCUMENTS

| | | | |
|---|---|---|---|
| CN | 113227909 | A | 8/2021 |
| WO | 2019-023797 | A1 | 2/2019 |
| WO | 2019-217749 | A1 | 11/2019 |
| WO | 2020-264158 | A1 | 12/2020 |
| WO | 2022-046736 | A1 | 3/2022 |
| WO | 2023-245047 | A1 | 12/2023 |

OTHER PUBLICATIONS

US 10,878,466, 09/2020, Edison et al. (withdrawn)
Mack, "Fundamental Principles of Optical Lithography", John Wiley & Sons, pp. 271-272, (Nov. 2007). (Abstract).
International Search Report from corresponding Patent Application No. PCT/US2023/022478 dated Sep. 8, 2023.

*Primary Examiner* — Jessica Whiteley
(74) *Attorney, Agent, or Firm* — Christensen, Fonder, Dardi, Busse; Diane E. Bennett; Peter S. Dardi

(57) ABSTRACT

Organotin compositions having the formula $RSnL_3$ and corresponding synthetic methods are described. R includes aromatic, cyclic and/or halogenated ether moieties, or polyethers, and L includes hydrolysable groups. The organotin compositions may be formed as radiation-patternable coatings on substrates. The coatings may have an average thickness from about 1 nm to about 75 nm and have the formula $RSnO_n(OH)_{3-2n}$, forming an oxo-hydroxo network, where R is a hydrocarbyl ether group with 1 to 30 carbon atoms and $0<n<3/2$, wherein regions of the coating are soluble in 2-heptanone in a puddle development step following a bake at 150° C. for 120 seconds. The coatings may be radiation-patternable using UV, EUV or ion beam radiation, and corresponding methods are described.

26 Claims, 10 Drawing Sheets

RADIATION SENSITIVE ORGANOTIN COMPOSITIONS HAVING OXYGEN HETEROATOMS IN HYDROCARBYL LIGAND

CROSS REFERENCE TO RELATED APPLICATIONS

This application claims priority to U.S. provisional patent application 63/343,331 filed May 18, 2023 to Jilek et al., entitled "Organotin Compositions Having Oxygen Heteroatoms in Hydrocarbyl Ligands," incorporated herein by reference.

BACKGROUND OF THE INVENTION

Organometallic compounds provide metal ions in solution and vapor forms for deposition of thin films. Organotin compounds provide high EUV absorption and radiation sensitive tin-ligand bonds that can be used to lithographically pattern thin films. The manufacture of semiconductor devices at ever shrinking dimensions with EUV radiation requires new materials with wide process latitude to achieve required patterning resolutions and low defect densities.

SUMMARY OF THE INVENTION

One aspect of the invention pertains to organotin compositions having hydrocarbyl groups comprising an Sn—C bond and having one or more carbons substituted with an oxygen heteroatom represented by the formula $R^1$—O—$R^2SnL_3$, wherein $R^1$ is chosen from a straight chain, aromatic, cyclic, branched, or unsaturated hydrocarbyl ligand having from 1 to 30 carbon atoms and further optionally substituted with one or more heteroatoms, such as O, F, I, Si, Sn, Te, and/or Sb, $R^2$ is a hydrocarbyl ligand having a Sn—C bond and from 2 to 5 carbon atoms, and L is a hydrolysable ligand. In some embodiments of particular interest, $R^1$—O—$R^2$— forms a C—Sn bond and introduces cyclic ethers, aromatic ethers, and polyethers, which can provide desirable ligands for the tin patterning compositions. The organotin compounds can have $R^1$—O—$R^2$— ligands selected to impart solubility in polar solvents. These organo tin compounds having ether ligands with C—Sn bonds and three hydrolysable ligands can be formulated into precursor blends with $R^0SnL'_3$ compounds in order to engineer desirable precursor properties with respect to patterning, especially with EUV radiation.

Another aspect of the invention pertains to a composition comprising a solvent and an organotin composition represented by the formula $R^1$—O—$R^2SnL_3$, wherein $R^1$ is chosen from a straight chain, aromatic, cyclic, branched, or unsaturated hydrocarbyl ligand having from 1 to 30 carbon atoms and further optionally substituted with one or more heteroatoms, such as O, F, I, Si, Sn, Te, and/or Sb, $R^2$ is a hydrocarbyl ligand having a Sn—C bond and from 2 to 5 carbon atoms, and L is a hydrolysable ligand.

Another aspect of the invention pertains to high purity organotin compositions having hydrocarbyl groups comprising an Sn—C bond and having one or more carbons substituted with an oxygen heteroatom and having a purity greater than 99.9999% on a metals basis.

Another aspect of the invention pertains to a method for forming a coating on a substrate wherein the method comprises hydrolyzing a composition represented by the formula $R^1$—O—$R^2SnL_3$, wherein $R^1$ is chosen from a straight chain, aromatic, cyclic, branched, or unsaturated hydrocarbyl ligand having from 1 to 30 carbon atoms and further optionally substituted with one or more heteroatoms, such as O, F, I, Si, Sn, Te, and/or Sb, $R^2$ is a hydrocarbyl ligand having a Sn—C bond and from 2 to 5 carbon atoms, and L is a hydrolysable ligand.

Another aspect of the invention pertains to a coating on a substrate wherein the coating comprises a composition comprising a $R^1$—O—$R^2$Sn moiety, wherein $R^1$ is chosen from a straight chain, aromatic, cyclic, branched, or unsaturated hydrocarbyl ligand having from 1 to 30 carbon atoms and further optionally substituted with one or more heteroatoms, such as O, F, I, Si, Sn, Te, and/or Sb, $R^2$ is a hydrocarbyl ligand having a Sn—C bond and from 2 to 5 carbon atoms.

Another aspect of the invention pertains to a method for patterning an organotin composition comprising a $R^1$—O—$R^2$Sn moiety, wherein $R^1$ is chosen from a straight chain, aromatic, cyclic, branched, or unsaturated hydrocarbyl ligand having from 1 to 30 carbon atoms and further optionally substituted with one or more heteroatoms, such as O, F, I, Si, Sn, Te, and/or Sb, $R^2$ is a hydrocarbyl ligand having a Sn—C bond and from 2 to 5 carbon atoms, and wherein the patterning is performed using UV, EUV, or ion beam radiation.

In a further aspect, the invention pertains to an organotin composition represented by the formula $RSnL_3$, where L is a hydrolysable ligand and R— is A) an aromatic ether represented by the formula Ar—O—$(CR'_2)_m$—, or B) R is a cyclic ether represented by the formula cyclic(O$(CR''_2)_n$CR'$R^0$—), or C) R is a halogenated ether represented by the formula $R^1OR^0C(R^2R^3)$—, or D) R is a polyether represented by the formula R1R2R3C—, where Ar is an aromatic organic moiety; m is an integer from 1 to 4; R' is a hydrogen or a hydrocarbyl group with 1 to 6 carbon atoms and optional heteroatoms; n is an integer from 1 to 8; R" is a hydrogen or hydrocarbyl group with 1 to 4 carbon atoms and optional heteroatoms; optionally a $CR''_2$ group can be replaced with an O to form a cyclic polyether, and two R" groups can combine to form a polycyclic structure; $R^0$ is a bond or a hydrocarbyl group with 1 to 5 carbon atoms and optional heteroatoms; $R^1$ is a hydrocarbyl group with 1 to 10 carbon atoms, with optional unsaturated bonds and/or optional hetero atoms; $R^2$ and $R^3$ are independently hydrogen, halogen or hydrocarbyl groups with 1 to 7 carbon atoms, with optional unsaturated bonds and/or optional heteroatoms, wherein at least one of $R^1$, $R^2$, $R^3$ have a halogen atom; and R1, R2, and R3 are independently hydrocarbyl groups with 1 to 19 carbon atoms, with optional unsaturated bonds and/or optional heteroatoms, at least two of R1, R2, R3 are ether moieties or at least one of R1, R2, R3 is a diether moiety. Solutions comprising the organo tin compositions in organic solvent are also described.

In a further aspect, the invention pertains to a radiation-patternable coated substrate comprising a substrate and a coating comprising any one or more of the organotin compositions described above.

In a further aspect, the invention pertains to a radiation-patternable coated substrate comprising a substrate and a coating having an average thickness from about 1 nm to about 75 nm and represented by the formula $RSnO_n(OH)_{3-2n}$, forming an oxo-hydroxo network, where R is a hydrocarbyl ether group with 1 to 30 carbon atoms and $0<n<3/2$, wherein regions of the coating are soluble in 2-heptanone in a puddle development step following a bake at 150° C. for 120 seconds.

In a further aspect, the invention pertains to a method of forming a radiation-patternable coated substrate comprising a substrate and a coating comprising any one or more of the organotin compositions described above.

In a further aspect, the invention pertains to a method of forming a radiation-patternable coated substrate, the method comprising: A) contacting a substrate surface with a vapor of an organotin composition described herein to form a deposit on the substrate surface; and heating the substrate with the deposit on the surface, wherein the conditions for contacting and/or heating provide for the hydrolysis of the hydrolysable ligands, L, to form a coating comprising $RSnO_n(OH)_{3-2n}$, forming an oxo-hydroxo network, where $0<n<3/2$; or B) depositing onto a substrate surface, a solution comprising an organic solvent and an organotin composition described herein at a concentration from about 0.0025 M to about 1.4 M measured based on tin cation concentration to form an initial coated surface; and heating the substrate with the initial coated surface, wherein the conditions for depositing and/or heating provide for the hydrolysis of the hydrolysable ligands, L, to form a coating comprising $RSnO_n(OH)_{3-2n}$, forming an oxo-hydroxo network, where $0<n<3/2$.

In a further aspect, the invention pertains to a method for patterning a substrate, the method comprising: irradiating a substrate with an organotin coating with patterned EUV radiation to form a latent image, wherein the coating has an average thickness from about 1 nm to about 75 nm and a composition represented by the formula $RSnO_n(OH)_{3-2n}$, forming an oxo-hydroxo network, where R is a hydrocarbyl ether group with 1 to 30 carbon atoms and $0<n<3/2$; and developing the latent image with a developer solvent to remove the unirradiated coating to form a developed image to form an image with a critical dimension of no more than about 50 nm and a dose of no more than about 80 $mJ/cm^2$. The organotin coating may be formed by: A) contacting a substrate surface with a vapor of an organotin composition to form a deposit on the substrate surface; and heating the substrate with the deposit on the surface, wherein the conditions for contacting and/or heating provide for the hydrolysis of the hydrolysable ligands, L, to for a coating comprising $RSnO_n(OH)_{3-2n}$, forming an oxo-hydroxo network, where $0<n<3/2$; or B) depositing onto a substrate surface, a solution comprising an organic solvent and an organotin composition at a concentration from about 0.0025 M to about 1.4 M measured based on tin cation concentration to form an initial coated surface; and heating the substrate with the initial coated surface, wherein the conditions for depositing and/or heating provide for the hydrolysis of the hydrolysable ligands, L, to for a coating comprising $RSnO_n(OH)_{3-2n}$, forming an oxo-hydroxo network, where $0<n<3/2$.

In a further aspect, the invention pertains to a method for synthesizing an organotin composition, the method comprising: reacting a halide hydrocarbyl compound (R-X, where X is a halide atom) with an organometallic composition comprising $SnL_3$ moieties associated with metal cations M to form the alkali metal tin composition, where M is an alkali metal, alkaline earth metal, and/or pseudo-alkaline earth metal (Zn, Cd, or Hg), and L is either an amide ligand resulting in an alkali metal tin triamide compound or an acetylide ligand resulting in an alkali metal tin triacetylide compound, to form correspondingly a monohydrocarbyl tin triamide ($RSn(NR'_2)_3$) or a monohydrocarbyl tin triacetylide ($RSn(C\equiv CR^s)_3$), $R^s$ is $SiR''_3$ or R', the three R" are independently H or R', and the R' are independently a hydrocarbyl group with from 1 to 31 carbon atoms and optional unsaturated carbon-carbon bonds, optional aromatic groups and optional hetero atoms, and where R is a hydrocarbyl ether group with from 1 to 31 carbon atoms and optional unsaturated carbon-carbon bonds, optional aromatic groups and optional hetero atoms comprising an aromatic ether represented by the formula $Ar—O—(CR'_2)_m—$, or a cyclic ether represented by the formula cyclic($O(CR'_2)_nCR'—$), or a polyether represented by the formula R1R2R3C—, where Ar is an aromatic organic group, m is an integer from 1 to 4, each R' is a hydrogen, a halogen, or a hydrocarbyl group with 1 to 6 carbon atoms and optional heteroatoms, n is an integer from 1 to 8, R1, R2, and R3 are independently hydrocarbyl groups with 1 to 19 carbon atom, at least two of R1, R2, R3 are ether moieties or at least one of R1, R2, R3 is a diether moiety. The method may be used to produce any of the organotin compositions described herein.

In a further aspect, the invention pertains to a method for synthesizing an organotin composition, the method comprising: reacting an alkylating agent selected from the group consisting of RMgX, $R_2Zn$, $RZnNR'_2$, or a combination thereof, with $Sn(NR'_2)_4$ in a solution comprising an organic solvent, wherein X is a halogen, wherein R' is a hydrocarbyl group with 1-10 carbon atoms, and wherein R is a hydrocarbyl ether group with from 1 to 31 carbon atoms and optional unsaturated carbon-carbon bonds, optional aromatic groups and optional hetero atoms comprising an aromatic ether represented by the formula $Ar—O—(CR'_2)_m—$, or a cyclic ether represented by the formula cyclic($O(CR'_2)_nCR'—$), or a polyether represented by the formula R1R2R3C—, where Ar is an aromatic organic group, m is an integer from 1 to 4, each R' is a hydrogen, a halogen, or a hydrocarbyl group with 1 to 6 carbon atoms and optional heteroatoms, n is an integer from 1 to 8, R1, R2, and R3 are independently hydrocarbyl groups with 1 to 19 carbon atom, at least two of R1, R2, R3 are ether moieties or at least one of R1, R2, R3 is a diether moiety. The method may be used to produce any of the organotin compositions described herein.

DETAILED DESCRIPTION OF THE INVENTION

Figure 1:
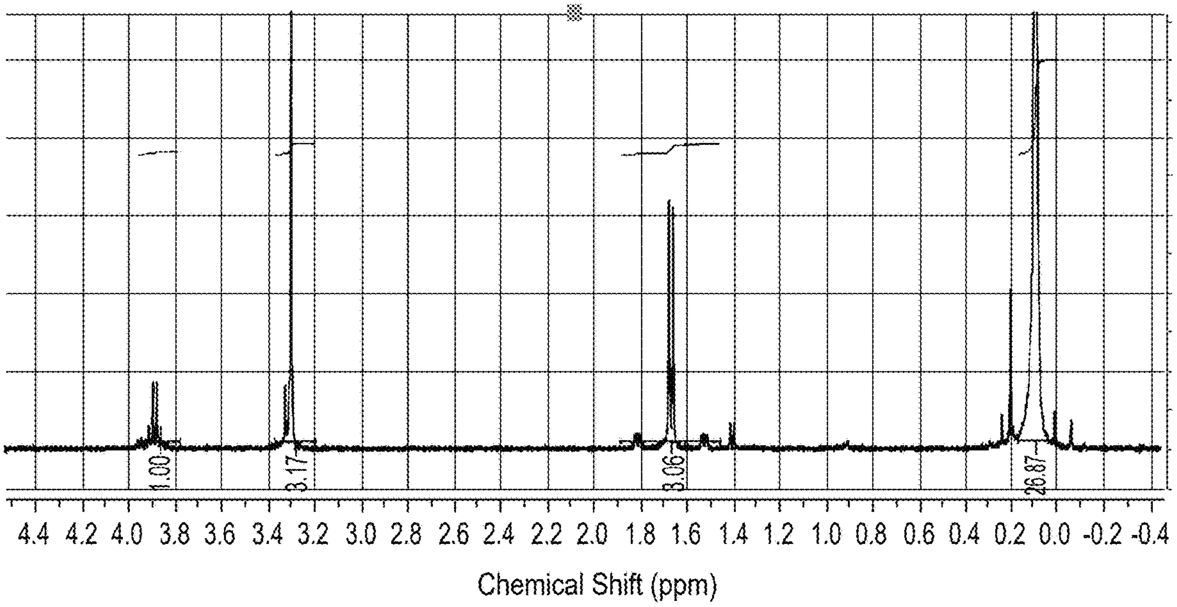
FIG. 1 is a $^1H$ NMR spectrum of methoxyethyltin tris(trimethylsilylacetylide) in benzene-$d_6$ synthesized in Example 1.

Organotin composition having ligands with oxygen atoms while forming C—Sn bonds can provide desirable patterning characteristics related to solubility properties for some patterning applications. In particular, specific ether ligands can provide desirable precursor solution stability as well as susceptibility of baked, non-irradiated coatings to exhibit solubility in desirable development solvents. To provide these characteristics, selected ether ligands can have aromatic ether structure or alkyl groups in which the ether oxygen atom is not directly bonded to the carbon atom providing the C—Sn bond. In some embodiments, the ether ligands can be cyclic ethers, diethers/polyethers or fluorinated ethers. Favorable patterning results can be obtained based on the improved developer solvent availability. Organotin materials have been shown to be effective in photosensitive compositions capable of producing high resolution and smooth patterns while also high sensitivities to suitable radiation sources, such as extreme ultraviolet (EUV) radiation.

Radiation-sensitive organotin compositions that are useful as high-resolution and high-sensitivity photoresists have been described by Meyers et. al., in U.S. Pat. No. 9,310,684, entitled "Organometallic Solution Based High Resolution Patterning Compositions", and in U.S. Pat. No. 10,228,618 (hereinafter the '618 patent) entitled "Organotin oxide hydroxide patterning compositions, precursors, and patterning", both of which are incorporated herein by reference. In general, the radiation sensitive organotin compositions comprise organic ligands bound to the Sn atoms via Sn—C and/or Sn-carboxylate bonds. It is generally believed that exposure of organotin materials to ionizing radiation (e.g., extreme ultraviolet, ultraviolet, or ion beams) radiation and subsequent processing results in the cleavage of the Sn—C bond and the formation of a condensed metal oxo/hydroxo network that comprises Sn—O—Sn and Sn—OH bonds within the exposed area. The increased concentration of these bonds results in a more condensed and hydrophilic material relative to the as-coated material, and therefore large chemical and development contrasts are created between the irradiated and the non-irradiated regions. It is therefore desirable to increase the efficiency of Sn—C bond cleavage upon irradiation. While not wanting to be limited by theory, Sn—C bond cleavage efficiency is believed to be related to the stability of the hydrocarbyl species bound to the Sn via the Sn—C bond. In other words, a lower Sn—C bond dissociation energy (BDE) is expected to correlate with increased sensitivity of the organotin composition to radiation. In some embodiments as described herein, hydrocarbyl groups having an Sn—C bond and comprising oxygen heteroatoms that can influence solubilities in ways that can improve solubility contrast during development.

The use of blends of patterning compositions has also been found to provide additional dimensions for designing overall coating properties. While reasonable EUV patterning results have been obtained with oxygen containing ligands with C—Sn bonding, the greatest value of these compounds may be in blends with other ligands such that overall solubility properties of the coating of patterning compositions can be adjusted as desired. In a non-limiting prophetic example, inclusion of the organotin oxygen-heteroatom compositions described herein in compositions comprising other organotin species that generally tend to form lower solubility hydrolysates and condensates (e.g., $MeSnL_3$, $^{t}BuSnL_3$) can increase the overall solubility of the blended compositions and coatings, which can yield coatings and patterns having lower defects such as particulates, scum, microbridging, and the like. Radiation-sensitive organotin materials are generally based on the conversion of a hydrocarbyl-Sn bond to a Sn—O and/or a Sn—OH bond after exposure to ionizing radiation, and therefore providing chemical contrast between irradiated and non-irradiated regions. Precursors for forming radiation-sensitive organotin compositions for lithographic patterning can generally be described by the formula $R_nSnL_{4-n}$, wherein n=1, 2, or 3, R is a hydrocarbyl ligand having a Sn—C bond, and L is a ligand having a hydrolysable or oxidizable Sn-L bond. For commercial embodiments, there is particle interest in embodiments based on n approximately 1. For use in semiconductor lithography, radiation-patternable organotin coatings can be generally be produced by exposing the $R_nSnL_{4-n}$ composition to water, and/or other oxygen source, in order to drive hydrolysis and condensation processes that convert the monomeric organotin species into polymeric organotin oxo/hydroxo networks. Generally, either solution based deposition or vapor phase deposition can be used. The hydrolysis to replace the hydrolysable ligands with an oxo-hydroxo network can take place during and/or following deposition.

As described herein, new photosensitive organotin compounds have one or more oxygen heteroatoms in an ether bonding structure within the hydrocarbyl ligand of the organotin compound. In embodiments of particular interest, the ether structure in the R ligand has an aromatic group or an alkyl group, such as a cyclic alkyl group, in which the oxygen atom is not directly bound to the carbon bonded to the tin atom. The compositions with the oxygen heteroatoms can be useful in photoresist compositions, and the presence of oxygen heteroatoms within the organic group has been found to provide for advantageous properties. Furthermore, the organotin compositions having oxygen heteroatoms described herein can be useful as photoresist compositions on their own or as part of blended compositions. The compositions described herein build on Applicant's earlier work involving hydrocarbyl ligands to tin with a C—Sn bond and three hydrolysable ligands. A methyl methyl ether ligand was described in published U.S. patent application 2022/0064192 to Edson et al. (hereinafter the '192 application), entitled "Methods to Produce Organotin Compositions with Convenient Ligand Providing Reactants," incorporated herein by reference. Comparative examples are provided below with the methyl methyl ether ligands. Compositions with improved oxygen containing ligands are described herein. The methyl methyl ether ligand of the '192 application produces a tin complex after hydrolysis to the oxo-hydroxo coating having limited solubility in polar solvents, particularly after heating the coatings at low-to-moderate temperatures, e.g. during a post-application bake or post-exposure bake. Alternative oxygen containing ligands are described herein to provide improved solubility in polar solvents.

The patterning process relies on the radiation driven cleavage of a hydrocarbyl ligand (R) bound to a tin (Sn) atom within an oxo-hydroxo matrix of a patternable coating. Following the radiation absorption, the considerable energy from the radiation is available for rupturing the carbon-tin bond, which can be followed by the R-group abstracting an atom or group to stabilize the fragmented R to form, for example, RH or ROH, which may be volatile so that the produced compound can leave the coating. Correspondingly, the Sn atom can pick up a ligand, such as an —OH or —O bond. In this way, the irradiated coating can become freer of organic species and more of a condensed oxo-hydroxo network. This process presumes that fragmented R-based species can migrate out of the coating prior to rebinding to Sn, and the efficiency of such processing can facilitate patterning at a lower radiation dose.

Efficiency of the escape of the R-based leaving group can be based on the chemical nature of the R-group and the processing to form the coating, which can influence the density, as well as the post irradiation processing that can facilitate the escape of the R-based species. The escape of the R-based species can be tracked using spectroscopic techniques. In particular, Fourier transform infrared (FTIR) spectroscopy can be used with intensity measurements from the spectra used to quantify the degree of remaining organic groups. The vibrational frequencies of known hydrocarbyl vibrations can be used to tune the FTIR measurements, and the organic content of the coatings can be accordingly monitored at different process conditions.

The removal of R-based species from the radiation absorption directly can be termed radiolysis, and the efficacy of radiolysis for a particular radiation dose can be evaluated by FTIR after irradiation with the measurement focused on an irradiated portion of the substrate. A post exposure bake, performed after irradiation but prior to image development, can be used to enhance escape of the R-based species. Details of a post exposure bake (PEB) are described further below. The PEB process can result in a radiation induced thermolysis behavior where release of remaining R-based species in the irradiated regions of the coating can be enhanced and generally under typical conditions used for PEB, the thermolysis alone is not effective to remove R-based species form the coating. In other words, the non-irradiated coating generally is less depleted of organic species as a result of the PEB and in the absence of irradiation. Nevertheless, radiation induced thermolysis can contribute a significant enhancement of depletion of organic species from the irradiated coating, which can reduce dose demands to process the coating.

In general, the properties of the radiation patternable coating materials can be evaluated at different stages of the processing. For example, the composition of the ligand influences the stability, and this shelf-life, of the precursor solutions. As described below, the precursor solutions are also influenced by the solvents and the control of the water levels. Applicant has made significant strides in controlling water levels to improve precursor solution stability and also to have very reproducible commercial precursor stability. See, U.S. Pat. No. 11,300,876 to Jiang et al., entitled "Stable Solutions of Monoalkyl Tin Alkoxide and Their Hydrolysis and Condensation Products," incorporated herein by reference. The precursor solutions are then used to deposit the patternable coatings onto a substrate. The as-deposited coatings can be heated to help remove the solvent. Generally, the hydrolysable ligands are removed and replaced with oxo-hydroxo ligands in a network within the coating during deposition and/or solvent removal. Ambient water or delivered water, e.g. water vapor, can contribute to the hydrolysis of the ligands. The characteristics of the precursor solution influences the characteristics of the resulting coating. Similarly, blends of precursors with different R groups can be beneficial with respect to balancing process conditions.

In other embodiments, the thermal stability of coatings comprising organotin compounds having hydrocarbyl ligands substituted with oxygen heteroatoms can be improved relative to similar compositions without the oxygen containing ligands. In general, organotin compounds decompose upon heating to high enough temperatures, wherein the Sn—C bond is cleaved and the hydrocarbyl is liberated from the matrix to result in a largely inorganic Sn coating composition. For example, the hydrocarbyl ligand can be liberated from the coating to result in an increase in oxide/hydroxide character (e.g., increased quantity of Sn—O and/or Sn—OH bonds) of the coating composition. Of course, the exact chemical composition of the coating can depend on a number of factors, such as environment's atmospheric composition and identity of the hydrocarbyl ligand. Some examples describing the effects of different gases present in the atmosphere for organotin compositions has been described in published U.S. Patent Application No. 2021/0271170, to Telecky et. al, entitled "Process Environment for Inorganic Resist Patterning", incorporated herein by reference.

Additionally, oxygen heteroatoms within the hydrocarbyl ligand can impart significant improvements to the solubility in selected solvents and solution stability, which can improve shelf life, of the organotin compositions relative to unsubstituted organotin compositions. For example, oxygen heteroatoms within the hydrocarbyl group can increase the polarity, hydrogen-bonding character, and/or hydrophilicity of the organotin oxo/hydroxo (i.e., hydrolyzed) compositions and can therefore improve the solubility of the species in suitable solvents. Normal processing and handling of organotin solutions can lead to absorption of water from the ambient or from exposure to moisture and can lead to hydrolysis of the organotin species. Hydrolyzed organotin species within the photoresist solution can then react to form clusters and larger species that may further oligomerize/polymerize to result in the formation of insoluble particulates in the solution, and these insoluble particulates can manifest as defects within the coated wafers upon deposition. The compositions described herein can increase the solubility of the hydrolyzed species, and thereby reduce the number of insoluble particles and the number of coated wafer defects formed. Another way to evaluate this improvement is through the evaluation of the dose-to-size measurement, which is related to critical dimension. Increased solubility of unexposed regions of the film in polar solvents can enable more complete removal of unexposed and lightly exposed material such as the material near the edges of the patterns. Additionally, increased solubility of unexposed or lightly exposed resist material can lead to reduced scum and residue between features. Thus, the radiation dose to achieve a desired feature size can be reduced through improved solubility of intermediate compositions near the pattern boundaries as well as potential inhomogeneities through the irradiated material. The patterning compositions with desirable ether ligands are also observed to improve radiation induced thermolysis that results in removal of cleaved organic species from the irradiated material.

With respect to imparting solubility in more polar solvents, cyclic ethers, aromatic ethers, fluoroethers and polyethers can provide desirable ligands for the tin patterning compositions. In particular, cyclic ethers can have the formula, for example, $[-CR(CR_2)_nO]$, n=2-7 or $-(CR_2)_n-[CR(CR_2)_mO]$, where [ ] indicate a cyclic structure n=1-10, m=2-7, and R a hydrogen or a hydrocarbyl group with 1 to 6 carbon atoms and optional heteroatoms where $R^0$ is a bond or a linear or branched hydrocarbyl group with 1 to 5 carbon atoms and optional heteroatoms. In the first formula, the cyclic ether is directly bonded to the tin atom, and in the second formula, the cyclic ether is spaced away from the tin atom. The two formulas can be combined as $[RR^0C(CR_2)_mO]$ where $R^0$ is a bond or a linear or branched hydrocarbyl group with 1 to 5 carbon atoms and optional heteroatoms and the cyclic ether is directly bonded to the Sn atom when $R^0$ is a bond. Cyclic polyethers have a $CR_2$ replace by —O—, and cyclic ethers can also be polycyclic compounds with multiple independent or overlapping rings. In some polycyclic ethers, two R groups combine to form a ring structure.

Aromatic ethers have an aromatic group pendent to the ether, such as $-(CR_2)_nO-(CR_2)_mCR_3$ where n=1-10, m=0-9 and R is hydrogen or a hydrocarbyl group with 1 to 5 carbon atoms optionally substituted with heteroatoms and where one or more H atoms are substituted with an aromatic group—Ar, where Ar can be $-C_6H_5$, $-C_5NH_4$, $-C_{10}H_7$, $-CH_2C_6H_5$, $-C_6H_4C_6H_5$, and the like. In alternative embodiments, the aromatic group can be directly bonded to the ether oxygen with a formula $-(CH_2)_nO-Ar$, and $-CH_2OC_6H_5$ is exemplified. With respect to linear (non-cyclic) polyethers, as noted above, it can be desirable to space the ether oxygen away from the carbon bonded to the Sn atom. These ligands can be represented by the formula $-CR^1R^2R^3$, where $R^1$, $R^2$, $R^3$ independently are H (for no more than two of the three R groups) or $-CR^4R^5R^6$, where $R^4$, $R^5$, $R^6$ are independently H (for no more than two of the three R groups) or a hydrocarbyl group with at least one of $R^4$, $R^5$, $R^6$ having an ether group, and the hydrocarbyl group generally having 1 to 8 carbon atoms. Thus, $-CR^1R^2R^3$ includes branched structures and groups with two or more ether groups. Suitable polyethers can be linear, branched, and/or cyclic. Polyether ligands can include, for example, $-CH_2OCH_2OCH_3$, $-CH_2CH(OCH_3)_2$, -cyclic $(CHCH_2OCH_2CH_2O)$, and the like. In any of the formulas of this paragraph, any of the H atoms can be substituted with a halogen atom (F, Cl, Br, or I) or other heteroatom based groups, such as hydroxyl, amino, cyano, thio, silyl, ether, keto, ester, or combinations thereof.

In further embodiments, desirable ligands can comprise halogen and ether bonds to provide target solubilities, possibly enhanced radiation absorption and desirable bonding properties. Embodiments of a halogenated ether represented by the formula $R^1OR^0C(R^2R^3)-$, $R^0$ is a bond or a linear or branched hydrocarbyl group with 1 to 5 carbon atoms and optional heteroatoms, $R^1$ is a hydrocarbyl group with 1 to 10 carbon atoms, with optional unsaturated bonds and/or optional hetero atoms, $R^2$ and $R^3$ are independently hydrogen, halogen or hydrocarbyl groups with 1 to 7 carbon atoms, with optional unsaturated bonds and/or optional heteroatoms, wherein at least one of $R^1$, $R^2$, $R^3$ have a halogen atom.

As components of a blended composition forming a radiation sensitive coating, radiation sensitivity, development efficiency, defect reduction and pattern characteristics can be adjusted to reach desired patterning performance. Inclusion of the compositions with oxygen containing ligands as described in the previous paragraph can be desirable to influence developer efficiency and corresponding defect reduction when included in a blended precursor composition used to form the radiation sensitive coating. In some embodiments, precursor solutions can comprise blends of precursor compounds, in which desirable precursor components with ether groups in ligands with a C—Sn bond are in proportions from about 2 mole percent (mol %) to about 95 mol % ether-based precursors. Within these broad ranges of precursor blends, there may be desirable blends with more minority amounts of ether based ligands from about 4 mol % to about 50 mol % and in additional embodiments from about 5 mol % to about 40 mol %, as well as alternative blends with a majority of the ether based ligands having from about 55 mol % to about 90 mol %, and in further embodiments form about 70 mol % to about 85 mol % precursors with ether-based ligands. A person of ordinary skill in the art will recognize that additional ranges of precursor proportions with oxygen-containing ligands within the explicit ranges above are contemplated and are within the present disclosure.

Film-forming capabilities of organotin compositions with oxygen-heteroatoms within ether groups within the hydrocarbyl chains may also be improved over film-forming capabilities with unsubstituted precursor compositions. The oxygen heteroatoms can provide for hydrogen-bonding sites that can enhance intermolecular bonding between species within the organotin oxo/hydroxo coating and can increase film homogeneity relative to unsubstituted compositions. Increased homogeneity generally correlates with fewer patterning defects, such that visual observation and evaluation of patterning defects can be sources for evaluating coating uniformity.

The identity of the hydrocarbyl ligand of the organotin composition can also play a significant role in the solubility of the partially and/or fully hydrolyzed organotin species following coating formation. Hydrolysis of $RSnL_3$ can result in the formation of known ovoid-shaped dodecameric $(RSn)_{11}O_{14}(OH)_8$ clusters that can display markedly different solubilities depending on the identity of the R group. For example, when R=tert-butyl $(-C(CH_3)_3)$, the resulting dodecamer generally shows low solubility, whereas when R=n-butyl $(-(CH_2)_3CH_3)$ the resulting dodecamer is much more soluble. For the organotin compositions having ether groups described herein, the solubility of partially and fully-hydrolyzed products, whether or not susceptible to cluster formation, can be improved due to the presence of oxygen atoms within the hydrocarbyl ligand.

In some embodiments, pattern defects, such as scum and microbridges, may also be reduced in the presently disclosed compositions relative to unsubstituted organotin compositions. While not wanting to be limited by theory, patterned defects can be formed by unintentional radiation exposure in space/dark areas of the pattern (i.e., areas not intended to be directly irradiated) which can cleave Sn—C bonds and lead to the formation of lightly polymerized RSn—O—Sn species in unintended areas. These lightly polymerized species are thought to be not fully exposed, i.e., only a small portion of the Sn—C bonds have been cleaved, but nevertheless can have lower solubilities in a developer and can remain after development to manifest as defects in the pattern. The compositions described herein result in lightly polymerized species with higher solubilities, and therefore can result in reduced amounts of patterned defects.

The compositions described herein are useful as precursors for forming radiation patternable coatings, as well as for converting the precursors into other useful compositions, such as compositions with different hydrolysable ligands or cluster-like compositions having Sn—O—Sn bonds. As described above, the radiation sensitivity of organotin materials arises from the character of the Sn—C bond and it is therefore generally desirable for the Sn—C bond to remain intact during processing from precursor to coating. For relevant embodiments, the hydrolysable ligands have little effect on photosensitivity (i.e., they do not substantially comprise the radiation patternable coatings) and are generally selected for desired processing, such as further purification, mode of deposition, stability, handling, and so on, although the hydrolysable ligands can influence the character of the hydrolyzed coating with respect to specific structure and density. Generally, hydrolysable ligands can be hydrolyzed to provide for oxo- and/or hydroxo ligands prior to photopatterning, if desired. Some examples of suitable hydrolysable ligands are $—NR'_2$, —OR', $—CCR'_3$, and $—CC(SiR'_3)$ wherein R' is an hydrocarbyl group having from 1 to 30 carbon atoms, for example $—NMe_2$, $—NEt_2$, -OiPr, -OtBu, -OtAmyl, $—CC(C_6H_5)$ ["PhAc"], $—CC(Si(CH_3)_3)$ ["TMSA"] and the like. Applicant's current commercial products are based on hydrolysable ligands with the structure —OR'.

In one embodiment of forming a radiation patternable coating, an organotin composition having oxygen heteroatoms in the R ligand of $RSnL_3$ can be dissolved in a solvent, directly coated on a substrate, optionally in the presence of water vapor, to produce a coating, and then additionally or alternatively baked further in the presence of water vapor to form a radiation-patternable organotin oxo/hydroxo coating. Water vapor can be present during coating deposition and/or during a pre-patterning bake step to perform in-situ hydrolysis to generate a radiation-patternable organotin oxo/hydoxo coating. Blending multiple $R_nSnL_{4-n}$ compounds where n=0, 1, or 2 (such as $SnL_4$, $RSnL'_3$, and $R'SnL''_3$, where R and R' are the same or different and L, L', and L" are the same or different) in a suitable solvent can provide for an organotin oxo/hydroxo film having a corresponding $R_nSn$ composition can be readily deposited.

In another embodiment, the relatively high vapor pressures and reactivity of many molecular $R_nSnL_{4-n}$ compounds, as described in the previous paragraph, enable the use of vapor deposition methods for deposition of radiation patternable organotin oxo/hydroxo coatings. Potential vapor deposition methods include, for example, physical vapor deposition (PVD), chemical vapor deposition (CVD), atomic layer deposition (ALD), or modifications thereof. For example, one or more gaseous $R_nSnL_{4-n}$ compounds can be introduced to a reaction chamber and reacted with a co-precursor such as $H_2O$ or its associated decomposition products, either in the gas phase or on a substrates surface, thereby producing a radiation sensitive organotin oxide hydroxide coating. In general, if the hydrolysable compound is deposited on the surface with a subsequent hydrolysis reaction, this process can be considered a PVD deposition with in situ hydrolysis, but if the hydrolysis takes place during a continuous deposition process, it can be considered a CVD process. Likewise, if the hydrolysable precursor is sequentially adsorbed, chemisorbed, or decomposed on the substrate surface, and the residual film reacted with a second reactive precursor through multiple deposition/reaction cycles to deposit the corresponding organotin oxide hydroxide it can considered an ALD process. Advantages of vapor deposition methods may include reduced resist film defect density, improved thickness and compositional uniformity, as well as conformal and side-wall coating of substrate topography.

Organotin Compositions with Oxygen Heteroatoms

Precursors to radiation-sensitive organotin compositions having oxygen heteroatoms can be represented by the formula $R^1—O—R^2SnL_3$, wherein $R^1$ is chosen from a straight chain, aromatic, cyclic, branched, or unsaturated hydrocarbyl ligand having from 1 to 30 carbon atoms and further optionally substituted with O, F, I, Si, Sn, Te, and/or Sb, $R^2$ is a hydrocarbyl ligand having a Sn—C bond and from 2 to 5 carbon atoms, and L is a hydrolysable ligand. In some embodiments, the $R^1$ or $R^2$ moieties can comprise linear, branched, or cyclic groups having one or more ethers. In some embodiments, $R^2$ comprises a branched carbon atom, i.e., a carbon atom having equal to or less than one C—H bond. In additional embodiments, $R^1$ and $R^2$ form a ring structure such that one or more O atoms become a part of a cyclic ether and $R^1—O—R^2$ can be equivalently written as cyclic($—CH[(CH_2)_{n:o}O(CH_2)_{m:o}]_o$), where $\Sigma_o$(n:o+m:o+1)+2 is the size of the ring, with n+m≥1 and o≥1, where m and n can vary according to the value of o. In embodiments where a cyclic ether is present, an alkyl moiety can be present between the cyclic ether and the Sn atom and can be represented by the formula ($—R^L[(CH_2)_{n:o}O(CH_2)_{m:o}]_o$), where RL is an hydrocarbyl ligand having a Sn—C bond and from 2 to 10 carbon atoms. Classes of desirable ether ligands are described in detail throughout the specification and directly supplement this particular discussion.

Some specific examples of structures represented by the $R^1—O—R^2Sn$ formula are shown below:

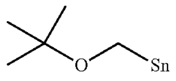

(MTBE)

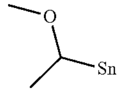

(MOE)

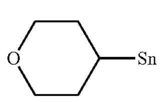

(THP)

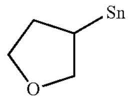

(THF)

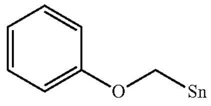

(MPE)

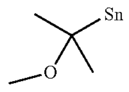

(MOP)

(mTHP)

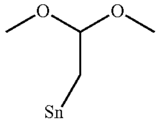

(DME)

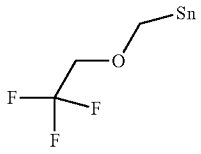

Synthesis of the oxygen-heteroatom organotin compositions disclosed herein can be synthesized by methods previously described by Applicant, such as in in published U.S. Patent App. No. 2019-0315781 by Edson et. al, entitled "Monoalkyl Tin Compounds With Low Polyalkyl Contamination, Their Compositions And Methods", and in the '192 application cited above, both of with are incorporated herein by reference. Selection of the synthesis technique can be based on practical aspects, such as purities obtained by different routes, yields, convenience of the procedures and availability of convenient starting materials. For example, desirable results for general synthesis of monoalkyltin trialkylamides have been achieved in which the alkylating agent may be a Grignard reagent, a diorganozinc reagent, or a mono-organozinc amide. These syntheses can directly produce the monoalkyl tin triamides with low polyalkyl contaminants that can be used for forming resists or that can be further purified to reduce the contaminant levels even further. In a further method developed by Applicant, the alkylating agent is an alkyl halide that reacts with a tin composition complexed with an alkali, alkaline, and/or pseudo-alkaline metal ion. Unless indicated otherwise, the synthesis processes and storage of compositions are performed isolated from the ambient atmosphere, such as in glove boxes, sealed systems, sealed containers, and the like.

In some embodiments, a Grignard-type reaction can be used to synthesize desired $R^1—O—R^2SnL_3$ compounds. A general Grignard reaction to form $R^1—O—R^2SnL_3$ can be represented by the following reaction:

$$RMgX+SnL_4 \rightarrow RSnL_3$$

In some embodiments, an oxidative stannylation reaction can be a desirable route to producing desired $R^1—O—R^2SnL_3$ compounds, as described further in the '192 application cited above. In a general oxidative stannylation reaction, a tin dihalide (e.g., $SnCl_2$) is first reacted with an organoalkali (R'M, e.g., R'Li) compound to form an alkali metal tin amide or an alkali metal tin acetylide, which is then reacted with an organohalide comprising the R group desired to attach to the tin atom. The synthesis can be represented by the following reactions:

$$3R'M+3HL+SnX_2 \rightarrow MSnL_3$$

$$MSnL_3+RX \rightarrow RSnL_3$$

In the above reactions, the organotin $RSnL_3$ products generally comprise amides or acetylides as the hydrolysable ligands L. In some embodiments, the hydrolysable ligand L is an amide, e.g., $—NMe_2$, $—NEt_2$, $—N^iPr_2$, and the like. Amides can be particularly suitable as hydrolysable ligands for vapor processing of organotin oxide hydroxide coatings due to their high vapor pressures and reactivity, as well as suitable for conversion to the corresponding organotin alkoxides. In some embodiments, the hydrolysable ligand is an acetylide. Organotin acetylides ($RSn(CCR')_3$) can be particularly suitable as precursors to prepare corresponding organotin alkoxides, and particularly useful R' groups are trialkylsilyl, e.g., $—Si(CH_3)_3$["TMSA"], $—Si(CH_2CH_3)_3$, ["TESA"], and phenyl ("PhAc"). Generally, efficient conversion of an organotin acetylide to the corresponding organotin alkoxide can depend on the identity of the alcohol, R, and R' groups and can be obtained through routine experimentation.

In some embodiments, the hydrolysable ligand for the radiation-patternable precursor composition is an alkoxide. Alkoxides can be particularly suitable as hydrolysable ligands for processing of oxide hydroxide coatings, for either solution processing or vapor processing, due to their shelf stability, hydrolytic susceptibility, and the relatively benign hydrolyzed products, e.g., alcohols, as well as vapor pressure for vapor deposition. Conversion of organotin amides and acetylides to organotin alkoxides can generally be achieved via alcholysis as described by the following reactions:

$$RSn(NR'_2)_3+3R''OH \rightarrow RSn(OR'')_3+3HNR'_2,$$

or $$RSn(CCR')_3+3R''OH \rightarrow RSn(OR'')_3+3HCCR',$$

wherein R' and R" are the same or different and are generally alkyl groups with ≤10 carbon atoms. Particularly suitable R' and R" groups are methyl, ethyl, propyl, butyl, pentyl (amyl), phenyl, and, when applicable, their respective isomers, such as tert-amyl.

Once produced, the $R^1—O—R^2SnL_3$ compounds can be further purified by any suitable means, such as distillation, to afford suitably pure compositions. The purification depends on the nature of the compound, but generally involves the separation of the desired product from by products and potentially any unreacted reagents. Purification can also comprise removal of any volatile compounds including solvents from the product mixture by drying or exposure to vacuum. For products with significant vapor pressures, it can be desirable to purify the product through vacuum distillation or, if desired, fractional distillation designed to achieve high purity. See published U.S. patent application 2020/0241413 (hereafter the '413 application) to Clark et al., entitled "Monoalkyl Tin Trialkoxides and/or Monoalkyl Tin Triamides With Low Metal Contamination and/or Particulate Contamination and Corresponding Methods," incorporated herein by reference.

Products, with or without first being purified, can be also reacted to form derivatives, such as organo tin trialkoxides, which can be further purified by the techniques above and other means known in the art. After preparation of trialkoxide composition, further purification of the composition can be performed if desired. In some embodiments, fractional distillation methods can be used as described by Edson et al in U.S. Pat. No. 10,787,466, entitled "Monoalkyl tin compounds with low polyalkyl contamination, their compositions and methods", incorporated herein by reference.

Purity can be assessed by the presence of undesired impurities, such as metals other than Sn or undesired byproducts. For semiconductor applications where nanoscale properties can be affected by small amounts of impurities, such as non-Sn trace metals, it is desirable for the organotin compounds to be of high purity. Metals purity can generally be assessed by any suitable means known in the art, such as mass spectrometry techniques including inductively couple plasma mass spectroscopy (ICP-MS) and similar techniques. In some embodiments, the $R^1—O—R^2SnL_3$ compounds can have a metals purity greater than about 99.99% (<100 ppm non-Sn metals), greater than about 99.999% (<10 ppm non-Sn metals) metals purity in other embodiments, greater than about 99.9999% (<1 ppm non-Sn metals) metals purity in further embodiments, and greater than about 99.99999% (<0.1 ppm non-Sn metals) metals purity in still further embodiments. For some applications, it can be desirable for the organotin compounds to have a high purity relative to other Sn compounds (i.e., impurities) by mass. In some cases, synthesis of organotin compounds can result in byproduct impurities. In some cases, syntheses of organotin compounds can produce a mixture of tin-containing reaction products (e.g., majority target monoalkyltin compound with small amounts of dialkyltin and/or inorganic tin impurities present in the product), and separation and purification of single-phase monoalkyltin can be difficult. Nuclear magnetic resonance (NMR) and gas chromatography mass spectrometry (GC-MS) techniques can be useful in analyzing purity of organotin compounds, such as the oxygen-heteroatom organotin compositions disclosed herein. In some embodiments, the $R^1—O—R^2SnL_3$ compounds can have a purity of at least about 90% by mass, in other embodiments a purity of at least about 95% by mass, in further embodiments a purity of at least about 99% by mass, and in other embodiments a purity of at least about 99.9% by mass.

Solution Compositions

The organotin compounds described herein can be useful as precursors for forming radiation patternable coatings for use in semiconductor lithography applications. Owing to their high absorption at EUV wavelengths and high etch resistance, the organo tin compounds thus can be desirable to produce smooth, uniform, and dense coatings to enable high resolution patterning with EUV lithography. In some embodiments, the organotin compounds described herein can be dissolved in a solvent to form organotin photoresist solutions to enable solution deposition to radiation patternable coatings.

Suitable solvents include those that the organotin photosensitive composition is suitably soluble in, but solvents can additionally be chosen based on their physical properties, such as flammability, viscosity, toxicity, or volatility in view of the processing approaches to be used. Further considerations for selection of appropriate solvents can include potential interactions with partially and/or fully hydrolysed organotin species, for example mitigation of undesired particulate formation and agglomeration. In some embodiments, and while not wanting to be limited by theory, primary alcohols can be beneficial in solvent compositions due to their ability to hinder hydrolysis, and can also better interact with and solubilize organotin hydrolysates and condensation products. Other considerations for suitable solvents could be cost and potential interactions with other processing materials. Some examples of suitable solvents include alcohols (e.g., 4-methyl-2-pentanol, 1-butanol, cyclohexanol, n-propanol, iso-propanol, n-butanol, iso-butanol, 2-isopropoxyethanol), esters (e.g., ethyl acetate, propylene glycol monomethyl ether acetate, ethyl lactate), ethers (e.g., propylene glycol monomethyl ether), ketones (e.g., 2-heptanone, cyclopentanone, cyclohexanone, 1-butanone, 4-methyl-2-pentanone), mixtures thereof, and the like. One of ordinary skill in the art will understand that other suitable solvents not explicitly listed are envisioned.

The organotin solution compositions can be conveniently specified based on tin ion molar concentration. In general, the organotin solution generally comprises from about 0.0025 M to about 1.4 M tin cation, in some embodiments from about 0.004M to about 1M, in further embodiments from about 0.005 M to about 0.75 M, also in some embodiments from about 0.01M to about 1M, and in additional embodiments from about 0.01 M to about 0.5 M tin cation. A person of ordinary skill in the art will recognize that additional concentration ranges and values within the explicit ranges above are contemplated and are within the present disclosure.

In some embodiments, the oxygen-heteroatom-ether organotin compositions can be present in a blended solution with one or more other monoalkyl tin compounds and/or other organotin compositions, such as $R_nSnL_{4-n}$ and its hydrolysates where n is 0, 1, or 2, and R is another ligand also of the same overall structure as $R^1—O—R^2$ as defined above, or R is a straight-chain, branched, cyclic, aromatic, and/or substituted hydrocarbyl group having a Sn—C bond. Such blended solutions, such as $aR'SnL_3+(1-a)\ R''_nSnL'_{4-n}$, with "a" being the proportion of the original ether-comprising organotin compound, can be tuned for optimization of various performance considerations, such as solution stability, coating uniformity, and patterning performance. Blended compositions can be achieved by combining two or more organotin compositions, such as $R_nSnL_{4-n}$, where L is a hydrolysable ligand, with or without a solvent. For example, neat $RSnL_3$ can be combined with neat $R'SnL'_3$ to form a blended precursor. The blended composition can then be diluted into a solvent, if desired. Alternatively, each individual organotin composition can be diluted into a desired solvent to form distinct organotin solutions, and then each individual organotin solution can then be combined to form a blended solution. In general, the hydrolysable ligand can be the same or different for each individual organotin component of the overall blended composition. In some embodiments, the oxygen-heteroatom-ether composition can comprise at least 1% by mol. Sn of the blended solution, in further embodiments at least 10% by mol. Sn of the blended solution, in further embodiments at least 25% by mol. Sn of the blended solution, and in further embodiments at least 75% by mol. Sn of the blended solution. Additional ranges of mol. % of the oxygen-heteroatom organotin compositions are contemplated and are within the present disclosure.

In some embodiments, the organotin photoresist solutions can be filtered to eliminate or reduce particulate contaminants. Suitable filtration methods have been described by Clark et. al in U.S. Pat. No. 11,498,934, entitled "Monoalkyl Tin Trialkoxides And/Or Monoalkyl Tin Triamides With Low Particulate Contamination and Corresponding Methods", incorporated herein by reference.

In some embodiments, the organotin photoresist solutions can be partially hydrolysed in solution by adding controlled amounts of water to the organotin photoresist solution composition (i.e., controlled in-situ hydrolysis). Suitable methods for adding controlled amounts of water to organotin photoresist solutions has been described in U.S. Pat. No. 11,300,876 by Jiang et al. (hereinafter the '876 patent), entitled "Stable Solutions Of Monoalkyl Tin Alkoxides And Their Hydrolysis And Condensation Products", incorporated herein by reference. While not wanting to be limited by theory, it is believed that controlled in-situ hydrolysis can enable distributions and concentrations of clusters and similar species that are more favorable to solution-based deposition, such as spin coating, by allowing some degree of hydrolysis and condensation to occur prior to deposition. In this way, different combinations of water concentration and solvent of the organotin photoresist solution can be tuned to afford a balance of solution stability and film quality, as taught in the '876 patent. Precursor solution stability can be evaluated through visual observation of the solutions with respect to particle formation and/or gelation over time. Commercial precursor solutions generally have an appropriate shelf-life, which may be greater than a month.

Radiation Patternable Coatings

A radiation patternable coating can be formed through deposition and subsequent processing of the photosensitive compositions onto a selected substrate. Deposition of radiation patternable coatings can be achieved through various means known by those of ordinary skill in the art.

It is generally desirable to perform the irradiation step for patterning following removal of any hydrolysable ligands through hydrolysis and formation of an oxo-hydroxo network. Therefore, the stable precursor solutions are appropriately converted between deposition and irradiation. Deposition of the radiation-sensitive organotin precursor compositions into radiation patternable coatings is generally achieved via hydrolysis and condensation processes. For example, solution deposition of radiation patternable organotin coatings has been described in the Meyers references above. Vapor deposition techniques that employ hydrolysis/condensation-based reactions have also been described by Wu et. al in published PCT Patent App. No. WO 2019/217749 entitled "Methods for Making EUV Patternable Hard Masks", incorporated by reference, as well as in the '618 patent cited above. In any case, the radiation-sensitive organotin compositions can be significantly converted into an organotin hydroxide oxide wherein the radiation sensitive organic ligands having Sn—C bonds to Sn atoms are incorporated into a loosely associated network of Sn—O—Sn and Sn—OH bonds. For the organotin compositions having oxygen heteroatoms described herein, the radiation patternable coatings may have additional intermolecular and/or network bonding. The presence of the oxygen atoms within the hydrocarbyl chain can enable intermolecular hydrogen bonding and/or polar interactions within the organotin oxo/hydroxo network.

If solution deposition is desired, a particularly useful solution deposition method is spin coating. Spin coating is well known in the art and can be particularly useful for photoresist processing in semiconductor manufacturing. In a typical spin coating method, the photoresist solution is delivered to the surface of a substrate, such as a Si wafer, and the substrate is rapidly rotated to form a coating. During the spin coating process, the hydrolysable ligands of the organotin precursor composition can react with ambient water to undergo significant hydrolysis and condensation to result in the formation of a coating on the substrate that comprises a Sn—O—Sn and Sn—OH network along with the radiation sensitive Sn—C bonds. In some embodiments, the improved photoresist precursor solutions are spin coated with a spin speed of between 500 and 3000 rpm. The rpm used is not particularly limited, but is generally tailored to yield a desired coating thickness. In general, slower spin speeds yield larger coating thicknesses than faster spin speeds for a given photoresist solution. Those of ordinary skill in the art will understand the relationship between spin speed and coating thickness.

The thickness of the radiation patternable coating can depend on the desired process. For use in single-patterning EUV lithography, coating thicknesses are generally chosen to yield patterns with low defectivity and reproducibility of the patterning. In some embodiments, suitable coating thickness can from between 1 nm and 100 nm, in some embodiments from about 1 nm to about 75 nm, in further embodiments from about 1.5 nm to 50 nm, and in further embodiments from about 2 nm to 25 nm. Those of ordinary skill in the art will understand that additional ranges of coating thickness are contemplated and are within the present disclosure.

In other embodiments, the radiation patternable coating can be formed through various vapor deposition methods, such as atomic layer deposition (ALD), chemical vapor deposition (CVD), physical vapor deposition (PVD), and the like. In a typical vapor deposition technique, generally one or more metal-containing precursors can be reacted with one or more with small molecule gas-phase reagents such as $H_2O$, $H_2O_2$, $O_3$, $O_2$, or $CH_3OH$, which serve as O and H sources for production of oxides and oxide hydroxides. Thus, the hydrolysable compounds can be directly deposited via hydrolysis during vapor phase deposition as the corresponding alkyl tin oxide hydroxide coating, which can then be appropriately patterned.

In CVD methods, two or more reactant gases are generally mixed in the chamber in the vicinity of the substrate surface. Therefore, sufficient stability can be designed into the reaction conditions to control undesirable vapor-phase reactions and nucleation. ALD precursors, introduced separately and sequentially to the reaction chamber, typically react with chemisorbed co-precursor or decomposition products saturating the substrate surface. Desirable features of $RSnL_3$ precursors include, for example, sufficient volatility for vapor-phase transport in the system, thermal stability to prevent premature decomposition, and appropriate reactivity with co-precursors to produce the target product under prescribed process conditions. In some embodiments, the $RSnL_3$ precursors can comprise alkoxides (e.g., L=OR) or dialkylamides (e.g., $L=NR_2$). The pressure and temperature in the reaction chamber can be selected to control the reaction process.

Coating thickness for radiation patternable coatings prepared by vapor deposition techniques can generally be controlled through appropriate selection of reaction time or cycles of the process. The thickness of the radiation patternable coating can depend on the desired process. For use in single-patterning EUV lithography, coating thicknesses are generally chosen to yield patterns with low defectivity and reproducibility of the patterning. In some embodiments, suitable coating thickness can from between 1 nm and 100 nm, in some embodiments form about 1 nm to about 75 nm, in further embodiments from about 1.5 nm to 50 nm, and in further embodiments from about 2 nm to 25 nm. Those of ordinary skill in the art will understand that additional ranges of coating thickness are contemplated and are within the present disclosure.

The substrate generally presents a surface onto which the coating material can be deposited, and it may comprise a plurality of layers in which the surface relates to an upper most layer. The substrate is not particularly limited and can comprise any reasonable material such as silicon, silica, other inorganic materials, such as ceramics, and polymer materials.

After deposition and formation of the radiation patternable coating, further processing can be employed prior to exposure with radiation. In some embodiments, the coating can be heated to a temperature between 30° C. and 300° C., in further embodiments from between 50° C. and 200° C., and in further embodiments from between 80° C. and 150° C. The heating can be performed, in some embodiments for about 10 seconds to about 10 minutes, in further embodiments from about seconds to about 5 minutes, and in further embodiments from about 45 seconds to about 2 minutes. Additional ranges for temperatures and heating durations within the above explicit ranges are contemplated and are within the present disclosure.

Patterning of the Compositions

Radiation generally can be directed to the coated substrate through a mask or a radiation beam can be controllably scanned across the substrate. In general, the radiation can comprise electromagnetic radiation, an electron-beam (beta radiation), or other suitable radiation. In general, electromagnetic radiation can have a desired wavelength or range of wavelengths, such as visible radiation, ultraviolet radiation, or X-ray radiation. The resolution achievable for the radiation pattern is generally dependent on the radiation wavelength, and a higher resolution pattern generally can be achieved with shorter wavelength radiation. Thus, it can be desirable to use ultraviolet light, X-ray radiation, or an electron-beam to achieve particularly high-resolution patterns.

Following International Standard ISO 21348 (2007) incorporated herein by reference, ultraviolet light extends between wavelengths of greater than or equal to 100 nm and less than 400 nm. A krypton fluoride laser can be used as a source for 248 nm ultraviolet light. The ultraviolet range can be subdivided in several ways under accepted Standards, such as extreme ultraviolet (EUV) from greater than or equal 10 nm to less than 121 nm and far ultraviolet (FUV) from greater than or equal to 122 nm to less than 200 nm. A 193 nm line from an argon fluoride laser can be used as a radiation source in the FUV. EUV light at 13.5 nm has been used for lithography, and this light is generated from a Xe or Sn plasma source excited using high energy lasers or discharge pulses. Soft x-rays can be defined from greater than or equal to 0.1 nm to less than 10 nm.

During exposure to radiation, such as ultraviolet (UV), extreme ultraviolet (EUV), and electron beams, and subsequent processing, the Sn—C are cleaved to result in a more condensed and hydrophilic oxide hydroxide network. As the relative concentration of organic ligands in the exposed area decreases, the polarity of the exposed area increases and the hydrophilicity of the exposed area increases.

Based on the design of the coating material, there can be a large contrast of material properties between the irradiated regions that have condensed coating material and the unirradiated, coating material with substantially intact Sn—C bonds. For embodiments in which a post-irradiation heat treatment is used, the post-irradiation heat treatment can be performed at temperatures from about 45° C. to about 300° C., in additional embodiments from about 50° C. to about 250° C. and in further embodiments from about 75° C. to about 200° C. The post exposure heating can generally be performed for at least about 0.1 minute, in further embodiments from about 0.5 minutes to about 30 minutes and in additional embodiments from about 0.75 minutes to about 10 minutes. A person of ordinary skill in the art will recognize that additional ranges of post-irradiation heating temperature and times within the explicit ranges above are contemplated and are within the present disclosure. The post-irradiation baking step can facilitate removal of radiation fragmented organic groups, generally R—, that presumably react with other groups to form a stable species that leaves the coating. Loss of organic species from the coating can be confirmed through spectroscopic measurement, such as Fourier transform infrared capable of measuring carbon vibrations. This high contrast in material properties further facilitates the formation of high-resolution lines with smooth edges in the pattern following development as described in the following section.

In general, organotin photoresists can be developed in the negative tone or the positive tone based on the developer's chemical identity. Nevertheless, for improvement of a particular patterning format may suggest certain ligands that can be better suited for a particular patterning format. Many of the ether containing ligands are best suited for negative tone patterning. Developer selection can be influenced by solubility parameters with respect to the coating material, both irradiated and non-irradiated, as well as developer volatility, flammability, toxicity, viscosity, and potential chemical interactions with other process materials. As shown in the Examples, the organotin coating compositions having oxygen heteroatoms described herein can display markedly different developer solubility relative to unsubstituted organotin compositions. In general, monoalkyltin compositions exhibit negative-tone behavior in organic solvents due to the largely non-polar/hydrophobic character created by the presence of alkyl ligands within the unexposed regions of the coating, therefore imparting solubility of those regions in organic solvents. Similarly, the irradiated regions of the coating, being deficient in alkyl ligands and richer in Sn—OH/Sn—O—Sn bonds, show an increased polarity/hydrophilicity and therefore exhibit an increased solubility in polar and/or acid-base solvents. As discussed above, the organotin compounds having oxygen heteroatoms can show increased polarity and/or hydrogen bonding character, and therefore exhibit increased interactions between the oxygen heteroatoms within the hydrocarbyl ligand and polar developer solvents. The ability to effectively use more polar solvents can be effective to form improved edges of the pattern with fewer defects. Similar improvements may also be possible for dry development through the selection of the development conditions.

For the negative tone imaging, generally the developer can be an organic solvent, such as the solvents used to form the precursor solutions. In general, developer selection can be influenced by solubility parameters with respect to the coating material, both irradiated and non-irradiated, as well as developer volatility, flammability, toxicity, viscosity and potential chemical interactions with other process material. In particular, suitable developers include, for example, alcohols (e.g., 4-methyl-2-pentanol, 1-butanol, isopropanol, 1-propanol, methanol), ethyl lactate, ethers (e.g., tetrahydrofuran, dioxane, anisole), ketones (pentanone, hexanone, 2-heptanone, octanone) and the like. The development can be performed for about 5 seconds to about 30 minutes, in further embodiments from about 8 seconds to about 15 minutes and in additional embodiments from about 10 seconds to about 10 minutes. A person of ordinary skill in the art will recognize that additional ranges within the explicit ranges above are contemplated and are within the present disclosure. In addition to the primary developer composition, the developer can comprise additional compositions to facilitate the development process. Suitable additives may include, for example, viscosity modifiers, solubilization aids, or other processing aides. If the optional additives are present, the developer can comprise no more than about 10 weight percent additive and in further embodiments no more than about 5 weight percent additive. A person of ordinary skill in the art will recognize that additional ranges of additive concentrations within the explicit ranges above are contemplated and are within the present disclosure. Developer blends and additives are described further in published U.S. patent application 2020/0326627 to Jiang et al., entitled "Organometallic Photoresist Developer Compositions and Processing Methods," incorporated herein by reference.

In some embodiments, a solventless (dry) development process may be conducted through the use of an appropriate thermal development or plasma development process, such as those described by Tan et al. in published PCT Pat App. No: WO 2020/264158, entitled "Photoresist Development With Halide Chemistries", incorporated herein by reference. For organotin photoresist coatings, dry development can be conducted through the use of halogen-containing plasmas and gases, for example HBr and $BCl_3$. In some cases, dry development may offer advantages over wet development such as reduced pattern collapse, deceased scum, and fine control over developer compositions, i.e., the plasma and/or etch gases.

After completion of the development step, the coating materials can be heat treated to further condense the material and to further dehydrate, densify, or remove residual developer from the material. This heat treatment can be particularly desirable for embodiments in which the oxide coating material is incorporated into the ultimate device, although it may be desirable to perform the heat treatment for some embodiments in which the coating material is used as a resist and ultimately removed if the stabilization of the coating material is desirable to facilitate further patterning. In particular, the bake of the patterned coating material can be performed under conditions in which the patterned coating material exhibits desired levels of etch selectivity. In some embodiments, the patterned coating material can be heated to a temperature from about 100° C. to about 600° C., in further embodiments from about 175° C. to about 500° C. and in additional embodiments from about 200° C. to about 400° C. The heating can be performed for at least about 1 minute, in other embodiment for about 2 minutes to about 1 hour, in further embodiments from about 2.5 minutes to about 25 minutes. The heating may be performed in air, vacuum, or an inert gas ambient, such as Ar or $N_2$. A person of ordinary skill in the art will recognize that additional ranges of temperatures and time for the heat treatment within the explicit ranges above are contemplated and are within the present disclosure. Likewise, non-thermal treatments, including blanket UV exposure, or exposure to an oxidizing plasma such as $O_2$ may also be employed for similar purposes.

Wafer throughput is a substantially limiting factor for implementation of EUV lithography in high-volume semiconductor manufacturing, and it is directly related to the dose required to pattern a given feature. However, while chemical strategies exist to reduce imaging dose, a negative correlation between the imaging dose required to print a target feature, and feature size uniformity (such as LWR) is commonly observed for EUV photoresists at feature sizes and pitches <50 nm, thereby limiting final device operability and wafer yields. Patterning capability can be expressed in terms of the dose-to-gel value. Imaging dose requirements can be evaluated by forming an array of exposed pads in which the exposure time is stepped from pad to pad to change the dosing of the exposure. The film can then be developed, and the thickness of the remaining resist can be evaluated for all of the pads, for example, using spectroscopic ellipsometry. The measured thicknesses can be normalized to the maximum measured resist thickness and plotted versus the logarithm of exposure dose to form characteristic curves. The maximum slope of the normalized thickness vs log dose curve is defined as the photoresist contrast (γ) and the dose value at which a tangent line drawn through this point equals 1 is defined as the photoresist dose-to-gel, (Dg). $D_0$ corresponds to the onset dose for initial increase in film thickness for a negative-tone resist. In this way common parameters used for photoresist characterization may be approximated following Mack, C. (Fundamental Principles of Optical Lithography, John Wiley & Sons, Chichester, U.K; pp 271-272, 2007, incorporated herein by reference.)

The patterned structures can be evaluated using automated imaging equipment and scanning electron microscope imagers are generally used. For example, specific commercial CDSEM instruments can measure critical line dimensions (line widths) and can also evaluate defects, such as microbridging. In some embodiments, the patterning with improved development based on resist engineering described herein can result in an increase in critical dimension using the equivalent development, coating formation and irradiation. Viewed another way, the concept of critical dimension can be expressed as a dose-to-size value, which is the radiation doze used to obtain a specific feature size. So an increase in critical dimension corresponds with a decrease in the dose-to-size value, which is consistent with the ability to use a lower dose to obtain a certain patterning objective. As demonstrated in the results, with blended resists, a dose-to-size based on a 16 nm critical dimension could be obtained with a dose of less than 30 $mJ/cm^2$.

EXAMPLES

Example 1: Syntheses of $R^1OR^2$—Sn-L3 Compounds

The following examples include the synthesis and NMR characterization of $R^1OR^2SnL_3$ compounds with hydrolysable ligand groups L including tris(trimethylsilylacetylide) $(TMSA)_3$ and tris(tert-butyl oxide) $(OtBu)_3$. The $R^1OR^2$— groups include $CH_3OCH_3CH$— or methoxyethyl (MOE), $CH_3OCH_2$— or methoxymethyl (MOM), $CH_3O(CH_3)_2C$— or methoxypropyl (MOP), $[(CH_2)_2OCH_2CH]$— or 3-tetrahydrofurfuryl (THF), $[(CH_2)_2O(CH_2)_2CH]$— or 4-tetrahydropyranyl (THP), $[(CH_2)_2O(CH_2)_2C(CH_3)]$— or 4-methyl-4-tetrahydropyranyl (mTHP), methyl-tert-butylether or $(CH_3)_3COCH_2$— (MTBE), methylphenylether or $C_6H_5OCH_2$— (MPE), dimethoxyethyl or $(CH_3O)_2CHCH_2$— (DME), and trifluoroethoxymethyl or $CF_3CH_2OCH_2$— (FET). The synthesis reactions were performed using oxidative stannylation reactions except for two synthesis using Grignard reagents as noted below.

Synthesis of $(CH_3OCH(CH_3))Sn(CC(Si(CH_3)_3))_3$, MOE-Sn-$(TMSA)_3$

Figure 2:
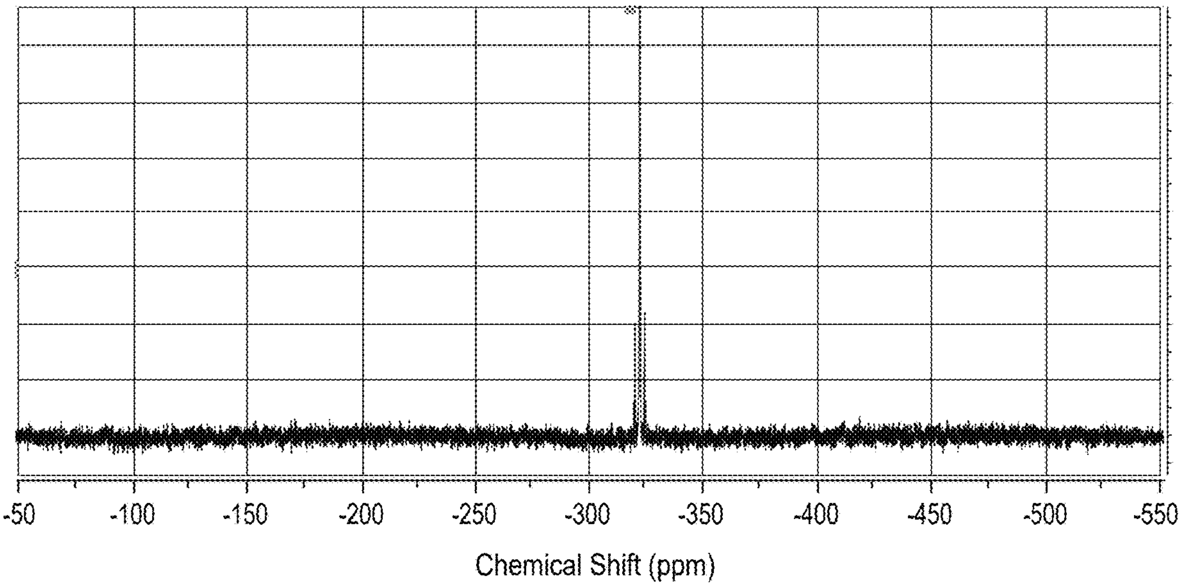
FIG. 2 is a $^{119}Sn$ NMR spectrum of methoxyethyltin tris(trimethylsilylacetylide) in benzene-$d_6$.

Ethynyltrimethylsilane (3.1 eq) and diethyl ether (1.5 mL/eq) were added to a vacuum-purged reaction vessel fitted with a thermometer, stirrer and addition funnel. The solution was cooled to <0° C. and n-butyllithium (2.0 M in diethyl ether, 3.0 eq) was added slowly to maintain an internal temperature below 10° C. Upon completion, the solution was stirred for 30 minutes and then tin(II) chloride (1 M in THF, 1.0 eq) was added while maintaining internal temperature below 10° C. Upon completion, the solution was stirred for 2 hours at 20° C. The internal temperature was then brought to <0° C. and 1-chloro-1-methoxyethane (1.1 eq) was added while maintaining an internal temperature <10° C. The solution was stirred for an additional 30 minutes followed by removal of volatiles under vacuum. Solids were washed with pentane and filtered. Volatiles were removed under vacuum and recrystallization from hexanes (~1 mL/1 g product) was conducted at −20° C. to afford MOE-Sn-$(TMSA)_3$ as a crystalline solid. 1H and 119Sn NMR spectra of MOE-Sn-$(TMSA)_3$ in benzene-$d_6$ are shown in FIGS. 1 and 2, respectively. The spectra show the following chemical shifts: $^1H$ NMR $(C_6D_6)$ δ 0.1 (s, 27H, $CH_3$), δ 1.7 (d, 3H, $CH_3$), δ 3.3 (s, 3H, $CH_3$), δ 3.9 (q, 1H, CH); $^{119}Sn$ NMR $(C_6D_6)$ δ −323.

Figure 3:
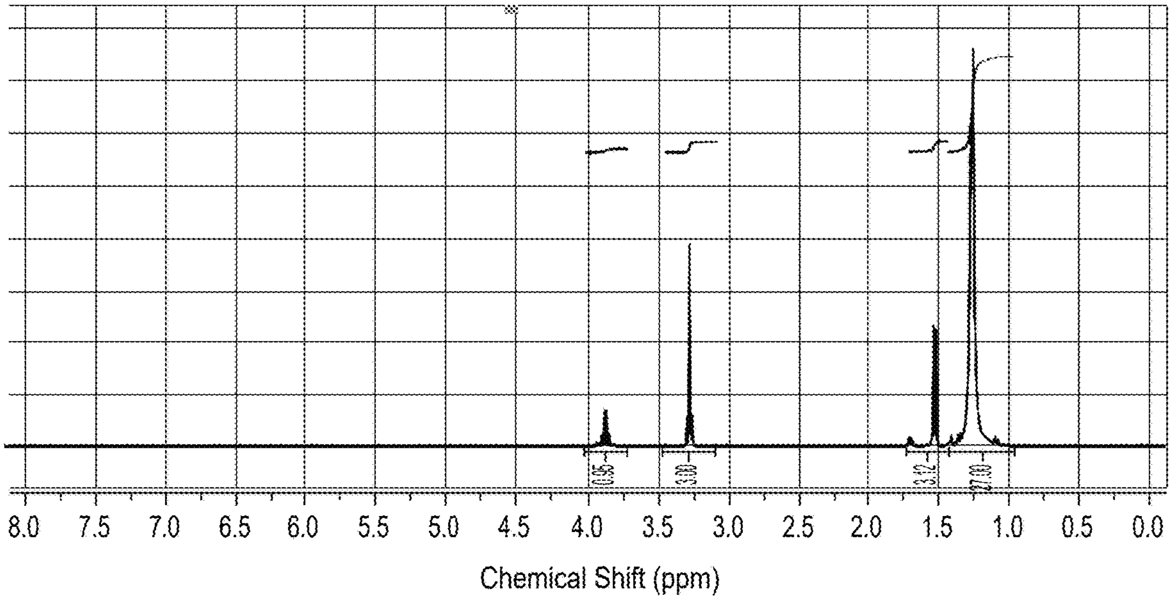
FIG. 3 is a $^1H$ NMR spectrum of methoxyethyltin tris(tert-butyl oxide) in benzene-$d_6$.
Figure 4:
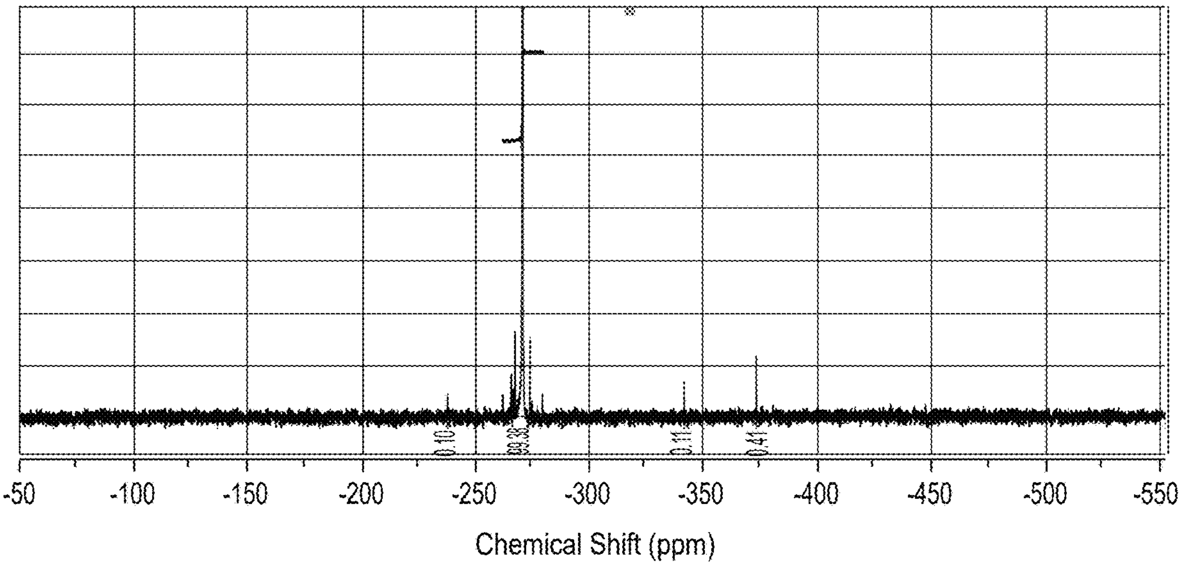
FIG. 4 is a $^{119}Sn$ NMR spectrum of methoxyethyltin tris(tert-butyl oxide) in benzene-$d_6$.

Conversion of MOE-Sn-$(TMSA)_3$ to $(CH_3OCH(CH_3))Sn(OtBu)_3$, MOE-Sn-$(OtBu)_3$ MOE-Sn-$(TMSA)_3$ and 2% Cu(OtBu) were placed in an inerted flask with a stir bar. Tert-Butanol (10 eq) and triethylamine (10 eq) were added and the volatiles were slowly removed to afford a viscous liquid. 1H and 119Sn NMR spectra of MOE-Sn-$(OtBu)_3$ in benzene-$d_6$ are shown in FIGS. 3 and 4, respectively. The spectra show the following chemical shifts: $^{1}$H NMR ($C_6D_6$) δ 1.3 (s, 27H, $CH_3$), δ 1.5 (d, 3H, $CH_3$), δ 3.3 (s, 3H, $CH_3$), δ 3.9 (q, 1H, CH); $^{119}$Sn NMR ($C_6D_6$) δ −271.

Synthesis of $((CH_3)_2COCH_3)Sn(CC(Si(CH_3)_3))_3$, MOP-Sn-$(TMSA)_3$

Figure 5:
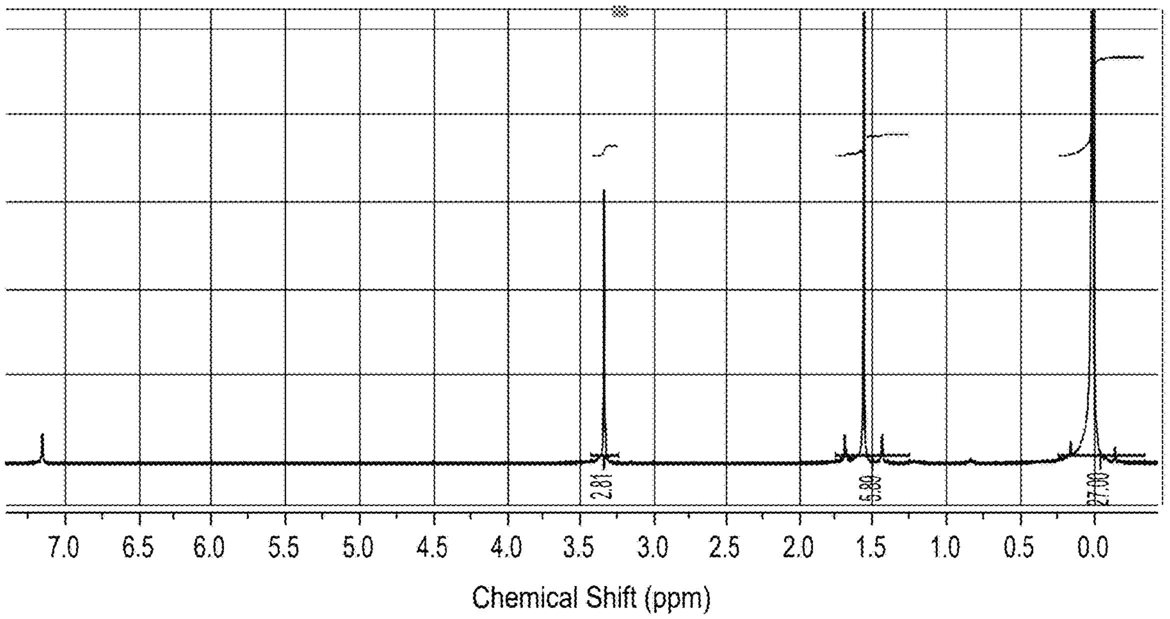
FIG. 5 is a $^1H$ NMR spectrum of methoxypropyltin tris(trimethylsilylacetylide) in benzene-$d_6$ synthesized in Example 1.
Figure 6:
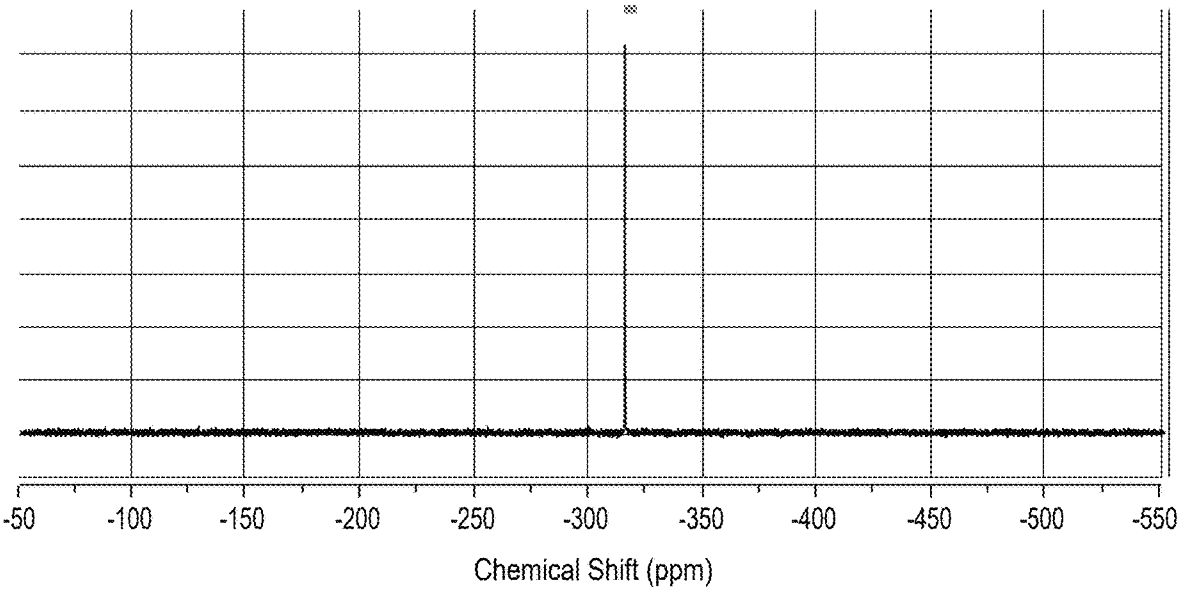
FIG. 6 is a $^{119}Sn$ NMR spectrum of methoxypropyltin tris(trimethylsilylacetylide) in benzene-$d_6$.

Ethynyltrimethylsilane (3.1 eq) and diethyl ether (1.5 mL/eq) were added to a vacuum-purged reaction vessel fitted with a thermometer, stirrer and addition funnel. The solution was cooled to <0° C. and n-butyllithium (2.0 M in diethyl ether, 3.0 eq) was added slowly to maintain an internal temperature below 10° C. Upon completion, the solution was stirred for 30 minutes and then tin(II) chloride (1 M in THF, 1.0 eq) was added while maintaining internal temperature below 10° C. Upon completion, the solution was stirred for 2 hours at 20° C. The internal temperature was then brought to <0° C. and 2-chloro-2-methoxypropane (1.1 eq) was added while maintaining an internal temperature <10° C. The solution was stirred for an additional 30 minutes followed by removal of volatiles under vacuum. Solids were washed with pentane and filtered. Volatiles were removed under vacuum and recrystallization from hexanes (~1 mL/1 g product) was conducted at −20° C. to afford MOP-Sn-$(TMSA)_3$ as a crystalline solid. 1H and 119Sn NMR spectra of MOP-Sn-$(TMSA)_3$ in benzene-$d_6$ are shown in FIGS. 5 and 6, respectively. The spectra show the following chemical shifts: $^{1}$H NMR ($C_6D_6$) δ 0.0 (s, 27H, $CH_3$), δ 1.6 (s, 6H, $CH_3$), δ 3.3 (s, 3H, $CH_3$); $^{119}$Sn NMR ($C_6D_6$) δ −315.

Synthesis of THP-Sn-$(dimethylamido)_3$ With Grignard Reagent and conversion to THP-Sn-$(OtBu)_3$ Diethylether (1.5 mL/eq) and tetrakis(dimethylamido)tin (1 eq) were added to a vacuum-purged reaction vessel fitted with a thermometer, stirrer and addition funnel, and the vessel was cooled to −20° C. Addition of tetrahydropyranylmagnesium bromide (1.0 eq in THF) was performed dropwise over the course of one hour. The solution was allowed to warm overnight, then was filtered to remove the precipitates. The filtrate was then concentration and volatiles were removed by vacuum to afford THP-Sn-$(dimethylamido)_3$ as a liquid. A sample of this material was extracted and analyzed via NMR.

Figure 7:
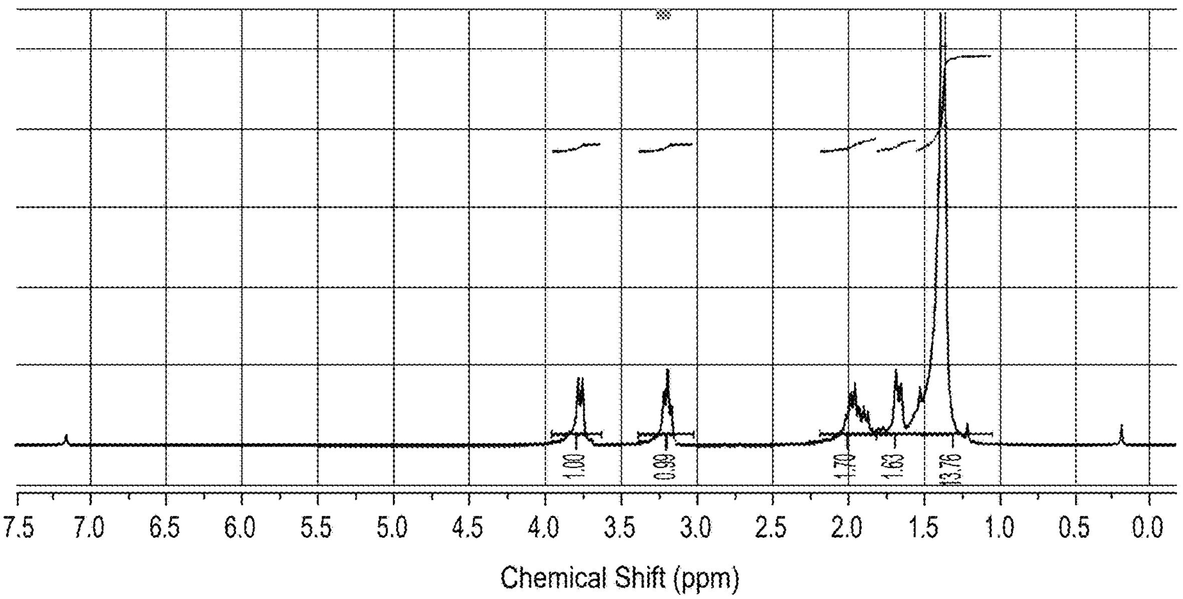
FIG. 7 is a $^1H$ NMR spectrum of tetrahydorpropanyltin tris(tert-butyl oxide) in benzene-$d_6$.
Figure 8:
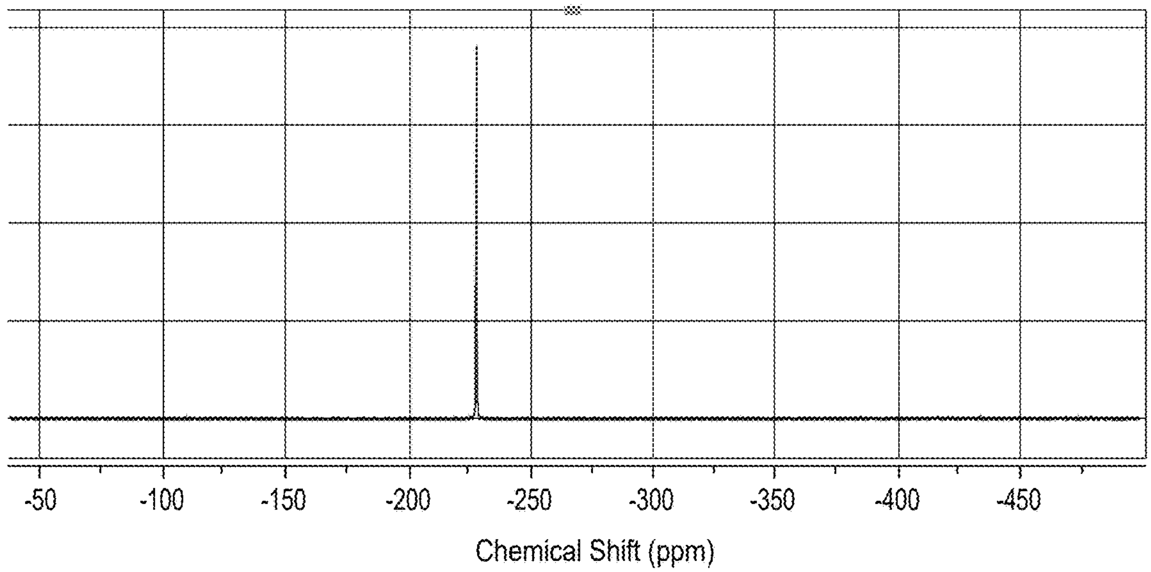
FIG. 8 is a $^{119}Sn$ NMR spectrum of tetrahydropropanyltin tris(tert-butyl oxide) in benzene-$d_6$.

Conversion of THP-Sn-$(dimethylamido)_3$ to THP-Sn-$(OtBu)_3$ was accomplished by opening the vessel containing THP-Sn-$(dimethylamido)_3$ to a bubbler and slowly adding tert-butanol in pentane (1 M/3.5 eq). The solution was then distilled to produce a viscous liquid. 1H and 119Sn NMR spectra of THP-Sn-$(OtBu)_3$ in benzene-$d_6$ are shown in FIGS. 7 and 8, respectively. The spectra show the following chemical shifts: $^{1}$H NMR ($C_6D_6$) δ 1.4 (s, 27H, $CH_3$), δ 1.7 (m, 1H, CH), δ 1.9 (m, 4H, $CH_2$), δ 3.2 (m, 2H, $CH_2$), δ 3.8 (m, 2H, $CH_2$); $^{119}$Sn NMR ($C_6D_6$) δ −231.

Synthesis of mTHP-Sn-$(OtBu)_3$ Using a Grignard Reagent

4-Bromo-4-methyltetrahydropyranylmagnesium bromide (11.2 mmol) in THF (50 mL) was slowly added to a reaction vessel with tetrakis(dimethylamino)stannane (3.3 g, 11.2 mmol) at −20° C. and warmed to room temperature over 12 hours. After the 12 hours, the reaction mixture was filtered and solvents were removed in vacuo. The contents were recrystallized from n-octane and converted to mTHP-Sn-$(OtBu)_3$ via addition of 3.25 eq tert-butanol. The product was distilled under dynamic vacuum and further purified by fractional distillation.

Synthesis of THF-Sn-$(OtBu)_3$ n-Butyllithium (1.03 mL, 2.53 mmol, 2.45 M in hexanes) was added to a cold solution (−50° C.) of trimethylsilylacetylene (0.248 g, 2.53 mmol) in diethyl ether (4 mL). After a few minutes, a slurry of tin(II) chloride (0.160 g, 0.845 mmol) in THF (4 mL) was added. The contents were warmed to 0° C. and stirred for 2 h. The flask was re-cooled to −50° C. and 3-iodotetrahydrofuran (0.167 g, 0.845 mmol) was added. The resulting reaction mixture was allowed to warm to room temperature over 16 hours at which time solvent was removed in vacuo. After solvent removal, the contents were recrystallized from pentane and converted to THF-Sn-$(OtBu)_3$ with excess 5 M triethylamine/t-butanol, which was then further purified by fractional distillation.

Figure 9:
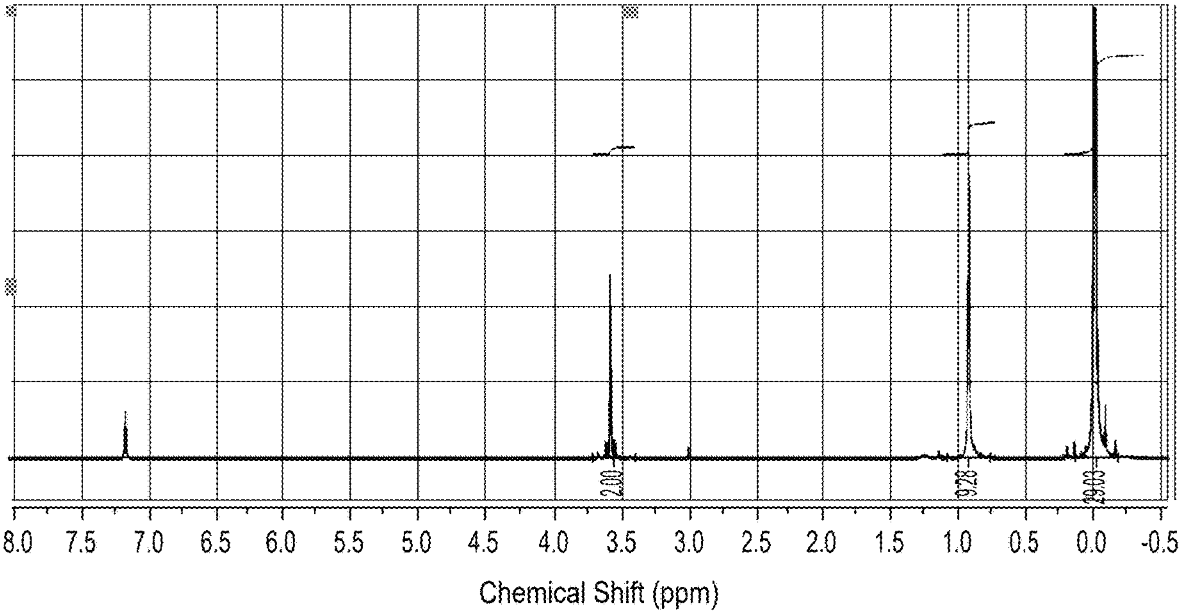
FIG. 9 is a $^1H$ NMR spectrum of methyl-tert-butylethertin tris(trimethylsilylacetylide) in benzene-$d_6$ synthesized in Example 1.
Figure 10:
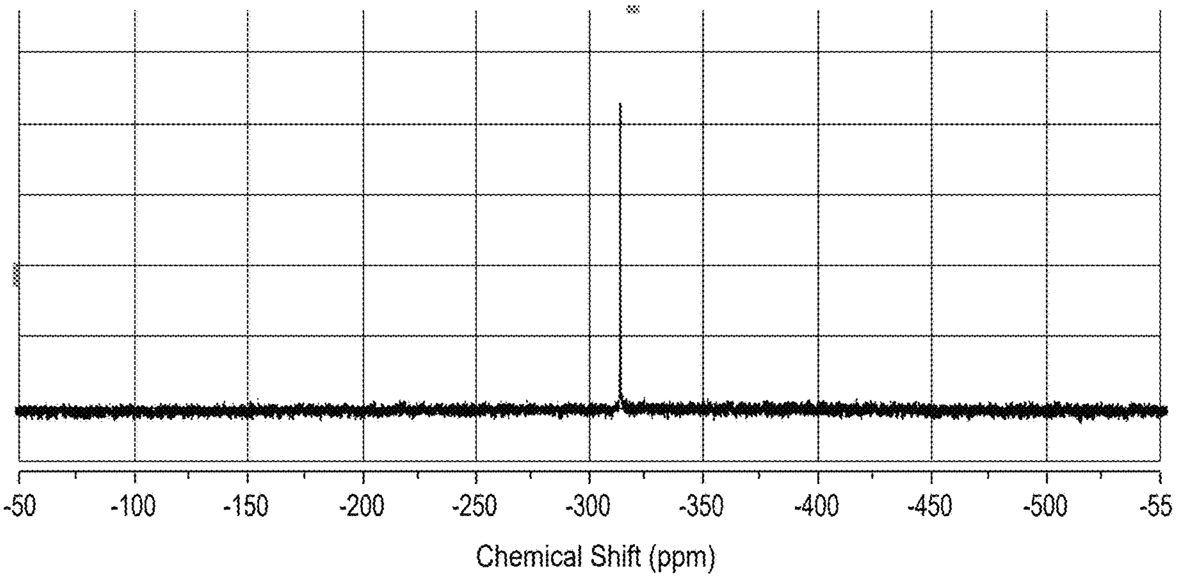
FIG. 10 is a $^{119}Sn$ NMR spectrum of methyl-tert-butylethertin tris(trimethylsilylacetylide) in benzene-$d_6$.

Synthesis of $(CH_3)_3CO(CH_2)Sn(CC(Si(CH_3)_3))_3$, MTBE-Sn-$(TMSA)_3$ and conversion to $(CH_3)_3CO(CH_2)Sn(OtBu)_3$, Ethynyltrimethylsilane (3.1 eq) and diethyl ether (1.5 mL/eq) were added to a vacuum-purged reaction vessel fitted with a thermometer, stirrer and addition funnel. The solution was cooled to <0° C. and n-butyllithium (2.0 M in diethyl ether, 3.0 eq) was added slowly to maintain an internal temperature below 10° C. Upon completion, the solution was stirred for 30 minutes and then tin(II) chloride (1 M in THF, 1.0 eq) was added while maintaining internal temperature below 10° C. Upon completion, the solution was stirred for 2 hours at 20° C. The internal temperature was then brought to <0° C. and 2-chloromethoxy-2-methylpropane (1.1 eq) was added while maintaining an internal temperature <10° C. The solution was stirred for an additional 30 minutes followed by removal of volatiles under vacuum. Solids were washed with pentane and filtered. Volatiles were removed under vacuum and recrystallization from hexanes (~1 mL/1 g product) was conducted at −20° C. to afford MTBE-Sn-$(TMSA)_3$ as a crystalline solid. 1H and 119Sn NMR spectra of MTBE-Sn-$(TMSA)_3$ in benzene-$d_6$ are shown in FIGS. 9 and 10, respectively. The spectra show the following chemical shifts: $^{1}$H NMR ($C_6D_6$) δ 0.0 (s, 27H, $CH_3$), δ 0.9 (s, 9H, $CH_3$), δ 3.6 (s, 2H, $CH_2$); $^{119}$Sn NMR ($C_6D_6$) δ −313.

Figure 11:
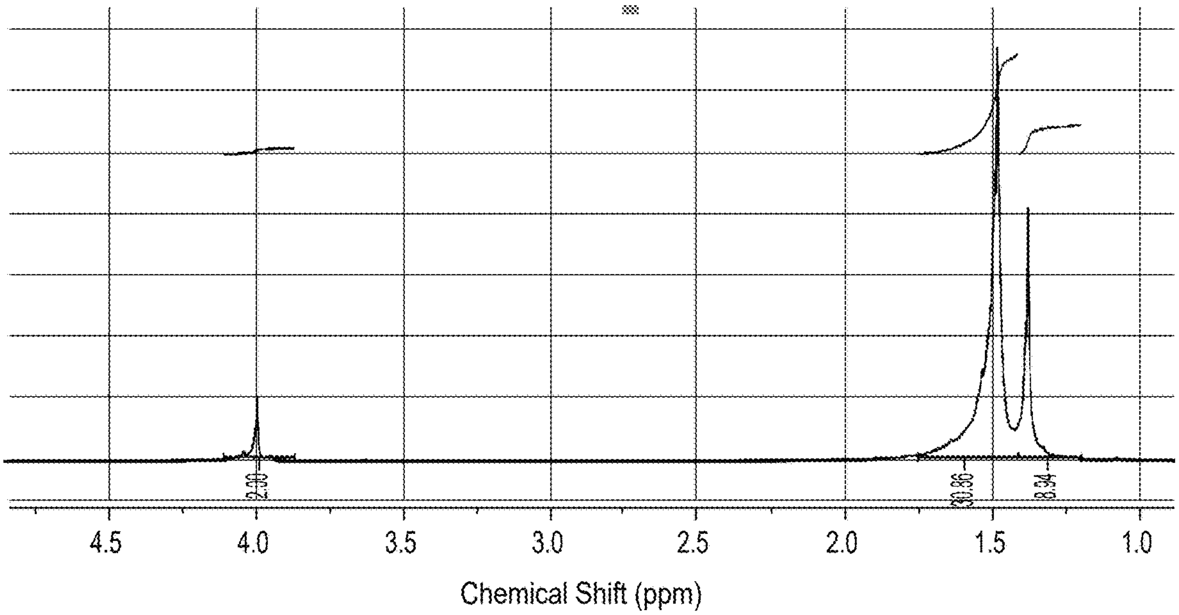
FIG. 11 is a $^1H$ NMR spectrum of methyl-tert-butylethertin tris(tert-butyl oxide) in benzene-$d_6$.
Figure 12:
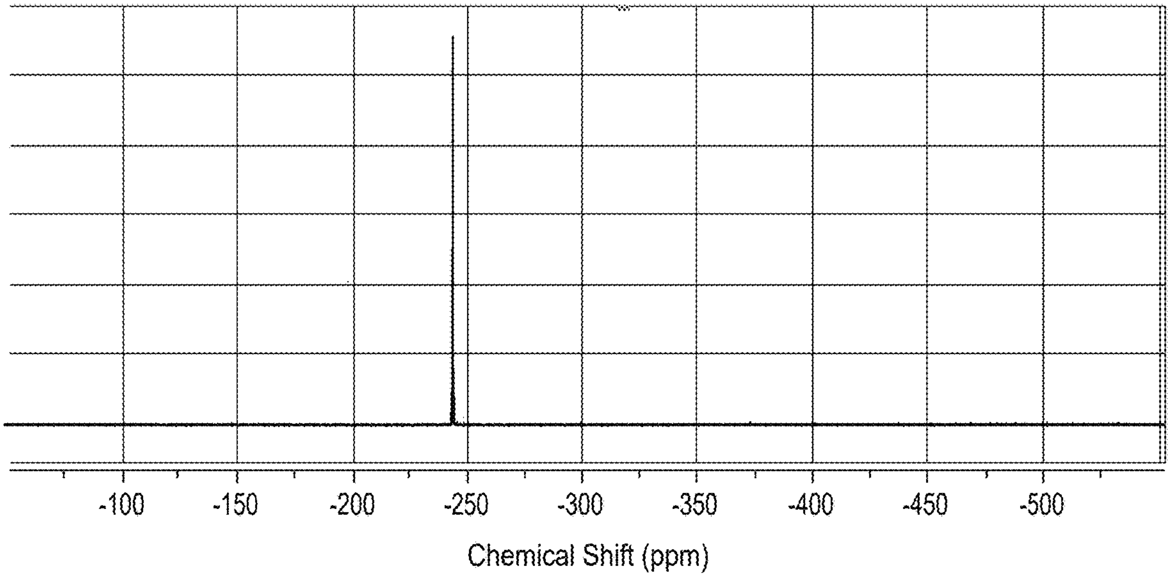
FIG. 12 is a $^{119}Sn$ NMR spectrum of methyl-tert-butylethertin tris(tert-butyl oxide) in benzene-$d_6$.

MTBE-Sn-$(TMSA)_3$ and 2% Cu(OtBu) were placed in an inerted flask with a stir bar, and tert-butanol (10 eq) and triethylamine (10 eq) were added. The volatiles were slowly removed to afford MTBE-Sn-$(OtBu)_3$ as a viscous liquid. 1H and 119Sn NMR spectra of MTBE-Sn-$(OtBu)_3$ in benzene-$d_6$ are shown in FIGS. 11 and 12, respectively. The spectra show the following shifts: $^{1}$H NMR ($C_6D_6$) δ 1.4 (s, 9H, $CH_3$), δ 1.5 (s, 27H, $CH_3$), δ 4.0 (s, 2H, $CH_2$); $^{119}$Sn NMR ($C_6D_6$) δ −245.

Figure 13:
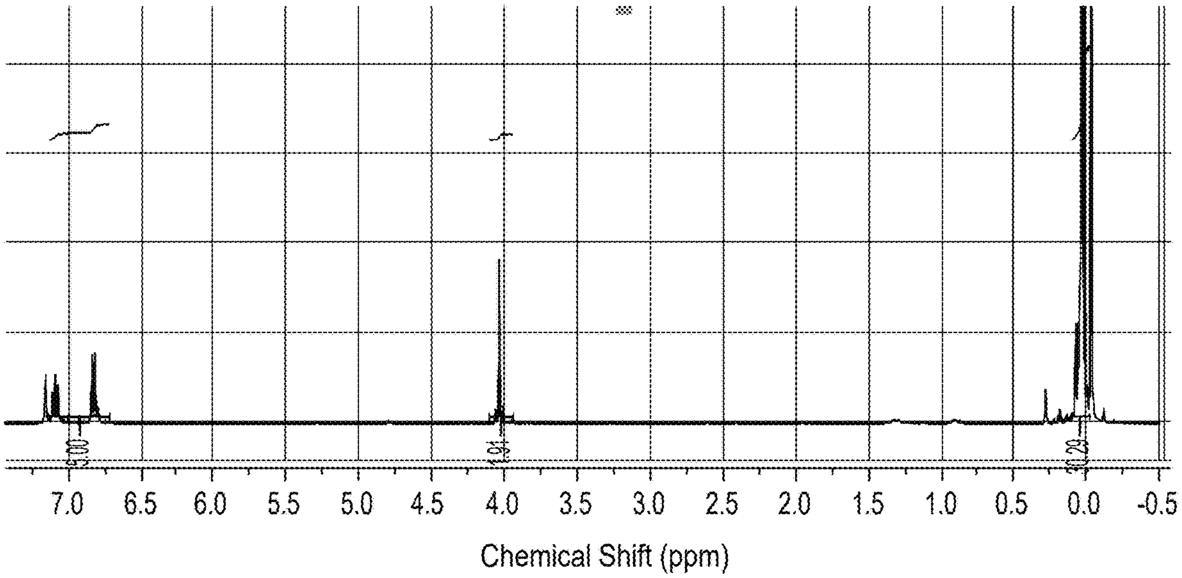
FIG. 13 is a $^{1}$H NMR spectrum of methylphenylethertin tris(trimethylsilylacetylide) in benzene-$d_6$ synthesized in Example 1.
Figure 14:
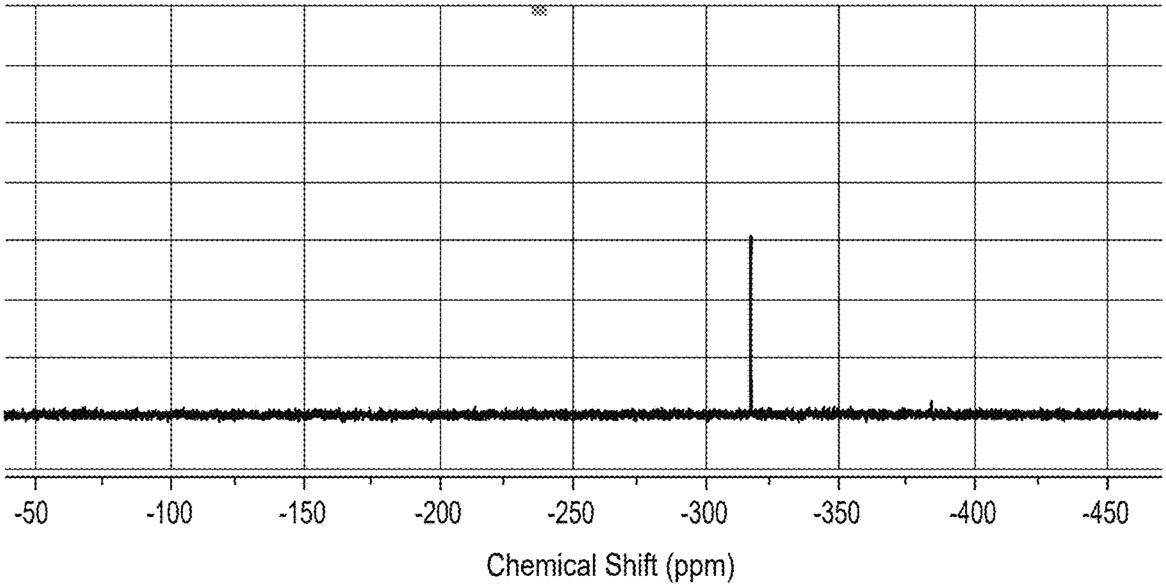
FIG. 14 is a $^{119}$Sn NMR spectrum of methylphenylethertin tris(trimethylsilylacetylide) in benzene-$d_6$.

Synthesis of $(C_6H_5)O(CH_2)Sn(CC(Si(CH_3)_3))_3$, MPE-Sn-$(TMSA)_3$ and conversion to $(C_6H_5)O(CH_2)Sn(OtBu)_3$, MPE-Sn-$(OtBu)_3$ Ethynyltrimethylsilane (3.1 eq) and diethyl ether (1.5 mL/eq) were added to a vacuum-purged reaction vessel fitted with a thermometer, stirrer and addition funnel. The solution was cooled to <0° C. and n-butyllithium (2.0 M in diethyl ether, 3.0 eq) was added slowly to maintain an internal temperature below 10° C. Upon completion, the solution was stirred for 30 minutes and then tin(II) chloride (1 M in THF, 1.0 eq) was added while maintaining internal temperature below 10° C. Upon completion, the solution was stirred for 2 hours at 20° C. The internal temperature was then brought to <0° C. and chloromethoxybenzene (1.1 eq) was added while maintaining an internal temperature <10° C. The solution was stirred for an additional 30 minutes followed by removal of volatiles under vacuum. Solids were washed with pentane and filtered. Volatiles were removed under vacuum and recrystallization from hexanes (~1 mL/1 g product) was conducted at −20° C. to afford MPE-Sn-$(TMSA)_3$ as a crystalline solid. 1H and 119Sn NMR spectra of MPE-Sn-$(TMSA)_3$ in benzene-$d_6$ are shown in FIGS. 13 and 14, respectively. The spectra show the following chemical shifts: $^1H$ NMR ($C_6D_6$) δ 0.0 (s, 27H, $CH_3$), δ 4.0 (s, 2H, $CH_2$), δ 6.8 (d, 3H, CH), δ 7.0 (t, 2H, CH); $^{119}Sn$ NMR ($C_6D_6$) δ −317.

Figure 15:
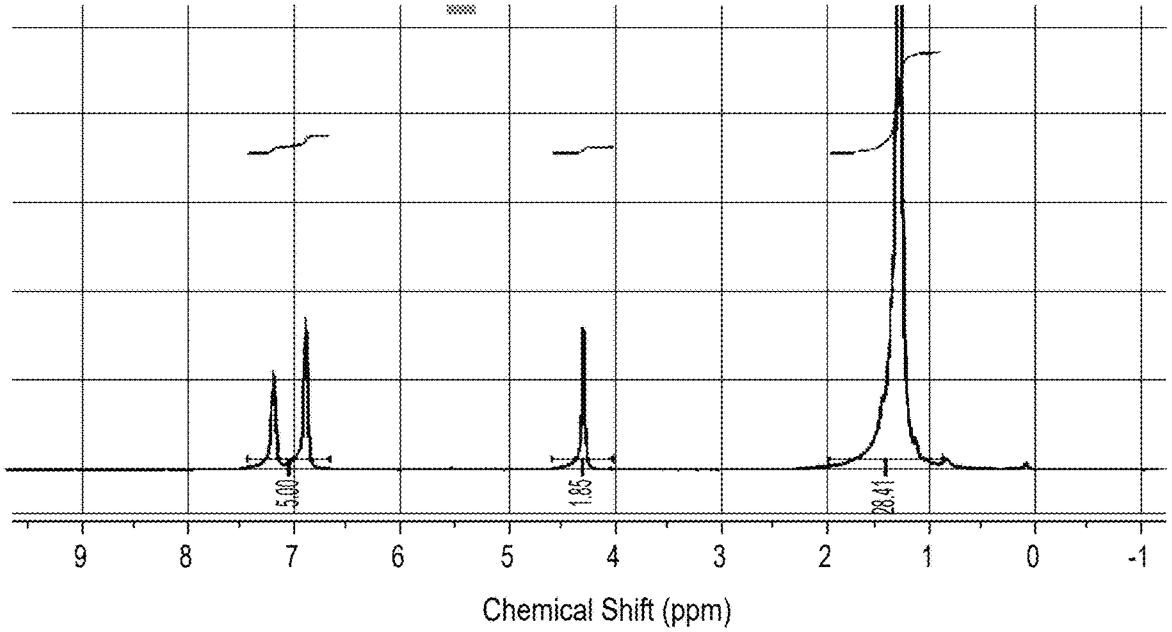
FIG. 15 is a $^{1}$H NMR spectrum of methylphenylethertin tris(tert-butyl oxide) in benzene-$d_6$.
Figure 16:
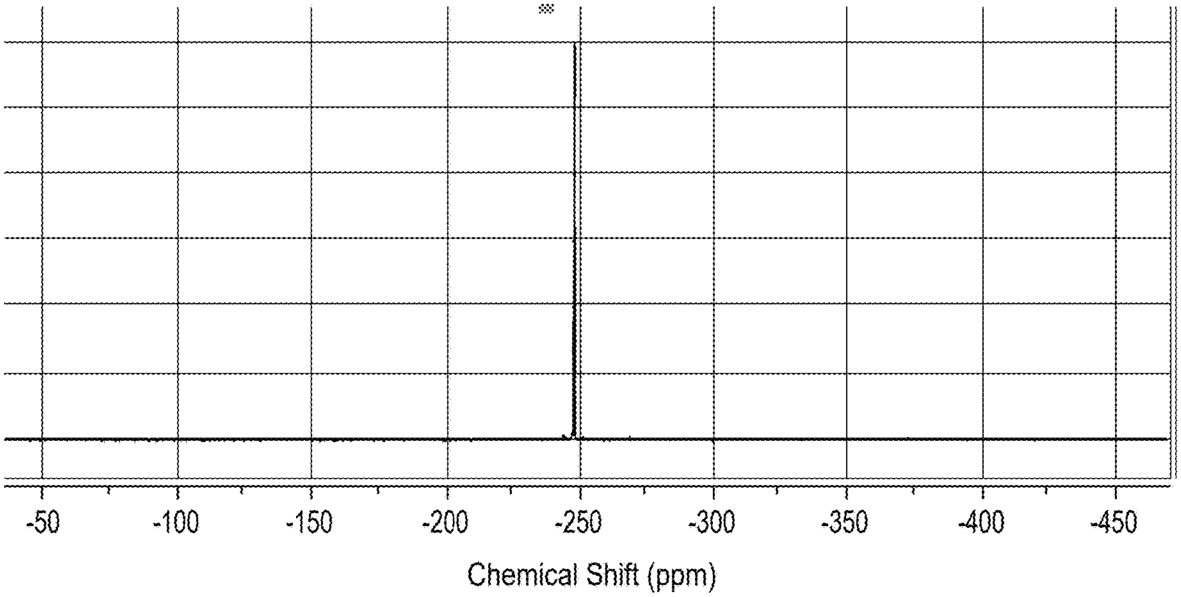
FIG. 16 is a $^{119}$Sn NMR spectrum of methylphenylethertin tris(tert-butyl oxide) in benzene-$d_6$.

MPE-Sn-$(TMSA)_3$ and 2% Cu(OtBu) were placed in an inerted flask with a stir bar, and tert-butanol (10 eq) and triethylamine (10 eq) were added. The volatiles were slowly removed to afford MPE-Sn-$(OtBu)_3$ as a viscous liquid. 1H and 119Sn NMR spectra of MPE-Sn-$(OtBu)_3$ in benzene-$d_6$ are shown in FIGS. 15 and 16, respectively. The spectra show the following chemical shifts: $^1H$ NMR ($C_6D_6$) δ 1.8 (s, 27H, $CH_3$), δ 4.8 (s, 2H, $CH_2$), δ 7.3 (d, 3H, CH), δ 7.7 (t, 2H, CH); $^{119}Sn$ NMR ($C_6D_6$) δ −248.

Synthesis of $(CH_3O)_2CHCH_2Sn(CC(Si(CH_3)_3))_3$, DME-Sn-$(TMSA)_3$

Figure 17:
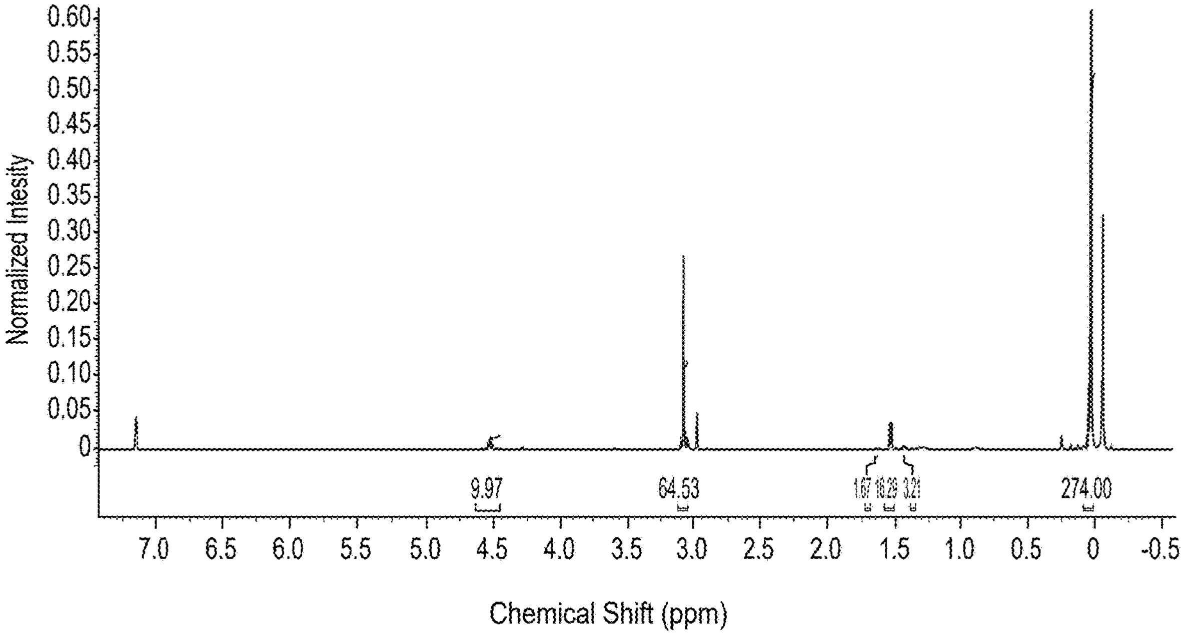
FIG. 17 is a $^{1}$H NMR spectrum of dimethoxyethyltin tris(trimethylsilylacetylide) in benzene-$d_6$ synthesized in Example 1.
Figure 18:
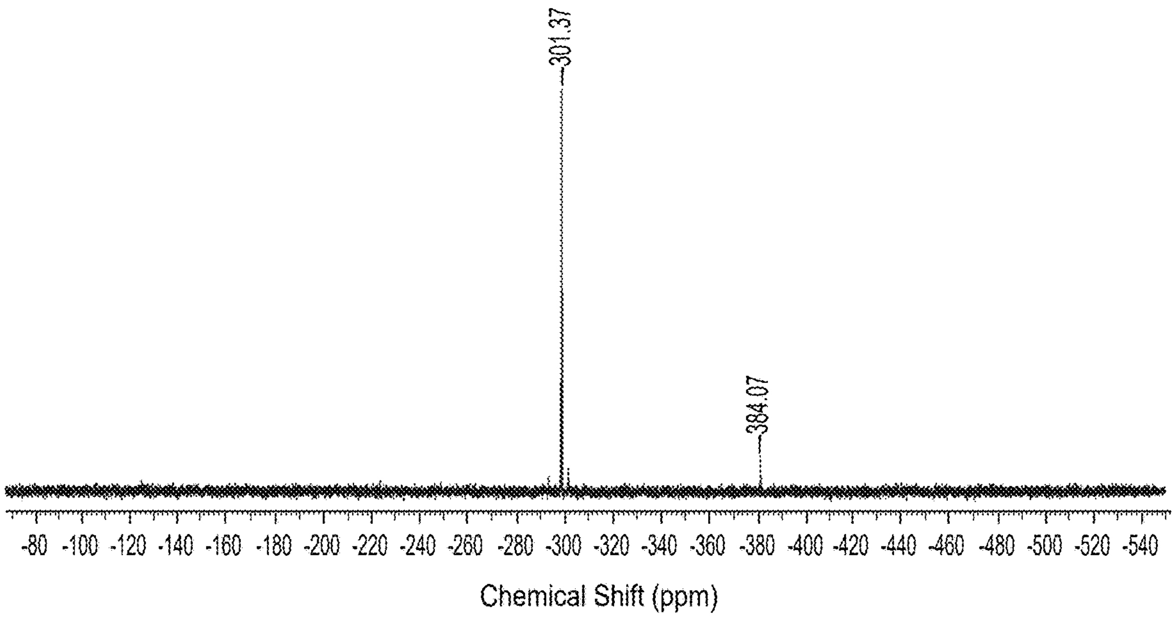
FIG. 18 is a $^{119}$Sn NMR spectrum of dimethoxyethyltin tris(trimethylsilylacetylide) in benzene-$d_6$.

Ethynyltrimethylsilane (3.1 eq) and diethyl ether (1.5 mL/eq) were added to a vacuum-purged reaction vessel fitted with a thermometer, stirrer and addition funnel. The solution was cooled to <0° C. and n-butyllithium (2.0 M in diethyl ether, 3.0 eq) was added slowly to maintain an internal temperature below 10° C. Upon completion, the solution was stirred for 30 minutes and then tin(II) chloride (1 M in THF, 1.0 eq) was added while maintaining internal temperature below 10° C. Upon completion, the solution was stirred for 2 hours at 20° C. The internal temperature was then brought to <0° C. and 1,1-dimethoxy-2-bromoethane (1.1 eq) was added while maintaining an internal temperature <10° C. The solution was stirred for an additional 30 minutes followed by removal of volatiles under vacuum. Solids were washed with pentane and filtered. Volatiles were removed under vacuum and recrystallization from hexanes (~1 mL/1 g product) was conducted at −20° C. to afford DME-Sn-$(TMSA)_3$ as a crystalline solid. 1H and 119Sn NMR spectra of DME-Sn-$(TMSA)_3$ in benzene-$d_6$ are shown in FIGS. 17 and 18, respectively. The spectra show the following chemical shifts: $^1H$ NMR ($C_6D_6$) δ 0.0 (s, 27H, $CH_3$), δ 1.5 (d, 2H, $CH_2$), δ 3.1 (s, 6H, $CH_3$), δ 4.5 (m, 1H, CH); $^{119}Sn$ NMR ($C_6D_6$) δ −301.

Synthesis of $CF_3CH_2OCH_2Sn(OtBu)_3$, FET-Sn-$(OtBu)_3$ n-Butyllithium (1.03 mL, 2.53 mmol, 2.45 M in hexanes) was added to a cold solution (−50° C.) of trimethylsilylacetylene (0.248 g, 2.53 mmol) in diethyl ether (4 mL). After a few minutes, a slurry of tin(II) chloride (0.160 g, 0.845 mmol) in THF (4 mL) was added. The contents were warmed to 0° C. and stirred for 2 hours. The flask was re-cooled to −50° C. and 2-(chloromethoxy)-1,1,1-trifluoroethane (0.125 g, 0.845 mmol) was added. The resulting reaction mixture was allowed to warm to room temperature over 16 hours at which time solvent was removed in vacuo to afford $CF_3CH_2OCH_2Sn(TMSA)_3$. The contents were recrystallized from pentane and converted to FET-Sn $(OtBu)_3$ with excess 5 M triethylamine/t-butanol and further purified by fractional distillation.

Synthesis of $CH_3OCH_2Sn(OtBu)_3$, MOM-Sn-$(OtBu)_3$

MOM-Sn-$(OtBu)_3$ was synthesized according to methods in the '192 patent referenced above.

Example 2: Preparation of Solutions and Shelf-Life Stabilities

Appropriate amounts of the organotin alkoxides synthesized in the above examples were dissolved into either 4-methyl-2-pentanol (Solvent 1) or n-propanol (Solvent 2) containing controlled amounts of added water to form a number of approximately 0.05 M [Sn] solutions. The prepared solutions were examined and observed over time to look for precipitate formation, and the results are presented in Table 1 below. Each sample was assigned a grade from A to F depending on the level of stability observed according to the following scale: A=no precipitates observed, B=precipitates observed after 1 month, C=precipitates observed after 1 week, D=precipitates observed after 1 day, F=precipitates observed after less than 1 day.

TABLE 1

| | | Solvent Water Content (ppm) | | | |
|---|---|---|---|---|---|
| Compound | Solvent | 300 | 1000 | 2000 | 3000 |
| MPE-Sn-$(OtBu)_3$ | 1 | A | A | A | A |
| MTBE-Sn-$(OtBu)_3$ | 1 | A | A | A | A |
| MOE-Sn-$(OtBu)_3$ | 1 | A | A | A | A |
| THP-Sn-$(OtBu)_3$ | 1 | A | A | B | A |
| MOM-Sn-$(OtBu)_3$ | 1 | A | A | F | F |
| mTHP-Sn-$(OtBu)_3$ | 1 | B | B | D | D |
| MPE-Sn-$(OtBu)_3$ | 2 | A | A | A | |
| MTBE-Sn-$(OtBu)_3$ | 2 | A | F | F | F |
| MOE-Sn-$(OtBu)_3$ | 2 | F | | | |
| THP-Sn-$(OtBu)_3$ | 2 | A | A | B | |
| MOM-Sn-$(OtBu)_3$ | 2 | A | C | C | |
| mTHP-Sn-$(OtBu)_3$ | 2 | D | D | D | |

For the $R^1OR^2SnL_3$ compositions shown in Table 1, the compounds with hydrocarbyl ligands having $R^1$ and/or $R^2$ groups with more than one carbon atom were observed to have greater stability towards precipitation in solutions with higher water levels than for the methoxy-methyl tin tris(tert-butoxide) composition.

Example 3: Resist Coating, Film Processing, and Image Formation

This example demonstrates the formation, solubility and patterning of radiation patternable coatings or films comprising the $R^1OR^2SnL_3$ compounds of Example 1.

Film Solubility

A series of solutions comprising a selection of the $R^1OR^2SnL_3$ compounds of Example 1 were prepared by dissolving appropriate masses of the organotin compounds in a few solvents with controlled water concentrations to form 0.05M [Sn] solutions. Coatings were then prepared by spin-coating the solutions onto thermal oxide/Si substrates (~100 nm $SiO_x$). The coatings were baked at 100° C. for 120 seconds or 150° C. for 120 seconds.

Baked coatings were submerged into various developer solutions to assess their solubilities. Developers A-M were used and are identified in Table 2. Solubilities were assessed by visually inspecting the post-developed substrate for remaining film thickness. Film solubilities were graded on a scale from A to F that were assigned based on remaining film thickness, wherein A=fully soluble (i.e., no substantial film remaining), B=mostly soluble, some residues remaining, C=partially soluble, D=mostly insoluble, F=no thickness loss observed.

The organotin compositions indicated were dissolved in 4-methyl-2-pentanol (Solvent 1), n-propanol (Solvent 2), or tert-amyl alcohol (Solvent 3). Each sample had a controlled amount of water added to the solvent prior to addition of the organotin compound to result low (300 ppm $H_2O$), med (2000 ppm $H_2O$), or high (4000 ppm $H_2O$) concentrations of water as measured by Karl-Fisher titration.

Tables 3 and 4 show the solubility of films that were baked at 100° C. for 120 seconds and at 150° C. for 120 seconds, respectively.

TABLE 2

| Developer | Chemical |
|---|---|
| A | 2-heptanone |
| B | 10% HCOOH in 2-heptanone |
| C | 10% acetic acid in propylene glycol methyl ether acetate (PGMEA) |
| D | 5% acetic acid in PGMEA |
| E | n-propanol |
| F | 2.38% tetramethylammonium hydroxide (aq.)-these samples are rinsed with pure water after development. |
| G | 10% formic acid (aq.) |
| H | 70/30 (by vol.) PGMEA/propylene glycol methyl ether |
| I | water |
| J | 4-methyl-2-pentanol |
| K | 10% Acetic acid (aq.) |
| L | hexanes |
| M | toluene |

TABLE 3

| Resist ROR'-Sn-$(OtBu)_3$ Compound | Resist Solvent | Developer | Solvent Water Concentration | Film Solubility |
|---|---|---|---|---|
| MOM | 2 | A | low | F |
| MOM | 2 | A | high | F |
| MOM | 2 | B | low | A |
| MOM | 2 | B | high | A |
| MOM | 2 | C | low | A |
| MOM | 2 | C | high | A |
| MOE | 1 | A | med | F |
| MOE | 3 | A | high | F |
| MOE | 2 | A | high | D |
| MOE | 1 | B | med | F |
| MOE | 3 | B | high | F |
| MOE | 2 | B | high | B |
| MOE | 1 | C | med | D |
| MOE | 3 | C | high | F |
| MOE | 2 | C | high | B |
| MOE | 1 | E | med | F |
| MOE | 3 | E | high | F |
| MOE | 2 | E | high | B |
| MOE | 1 | F | med | D |
| MOE | 3 | F | high | A |
| MOE | 2 | F | high | A |
| MOE | 1 | G | med | F |
| MOE | 3 | G | high | B |
| MOE | 2 | G | high | A |
| MOE | 1 | J | med | F |

TABLE 3-continued

| Resist ROR'-Sn-$(OtBu)_3$ Compound | Resist Solvent | Developer | Solvent Water Concentration | Film Solubility |
|---|---|---|---|---|
| MOE | 3 | J | high | F |
| MOE | 2 | J | high | C |
| MOE | 1 | K | med | F |
| MOE | 3 | K | high | B |
| MOE | 2 | K | high | B |
| THP | 1 | A[a] | low | A |
| THP | 1 | D | low | A |
| THP | 1 | F | low | A |
| THP | 1 | G | low | A |
| THP | 1 | H | low | A |
| THP | 1 | I | low | A |
| THP | 1 | La | low | F |
| THP | 1 | M[a] | low | F |
| mTHP | 1 | A | low | A |
| mTHP | 1 | D | low | B |
| mTHP | 1 | I | low | B |
| mTHP | 1 | M | low | F |

[a]no bake performed for these samples.

TABLE 4

| Resist ROR'-Sn-$(OtBu)_3$ Compound | Resist Solvent | Developer | Solvent Water Concentration | Film Solubility |
|---|---|---|---|---|
| THP | 1 | A | low | A |
| THP | 1 | F | low | A |
| THP | 1 | G | low | A |
| THP | 1 | H | low | A |
| THP | 1 | I | low | A |
| THP | 1 | K | low | A |
| THP | 1 | D | low | A |
| THP | 2 | D | low | A |
| mTHP | 1 | A | low | B |
| mTHP | 1 | D | low | B |
| mTHP | 1 | I | low | B |
| mTHP | 1 | M | low | F |
| MOM | 2 | A | high | F |
| MOM | 2 | K | high | F |

As seen in Tables 3 and 4, MOE-based films showed high solubility in most solvents except non-polar solvents (e.g., toluene and hexanes). In contrast, the comparative example comprising MOM-based films only showed solubility in non-aqueous acidic developers (e.g., 10% acetic acid in PGMEA) at 100° C. At 150° C., MOM-based films were rendered insoluble in the solvents tested, whereas MOE-based films remained soluble at 150° C. High solubilities of MOE-based films after baking can afford improved negative-tone patterning behavior by enabling removal of non-irradiated regions of the coating, and can therefore reduce defects, such as scum. Interestingly, the MOE-based films are soluble in water, even after baking the film at 150° C. Similarly, the films comprising the cyclic ether hydrocarbyl ligands THP and mTHP shows high solubility in polar solvents at both 100° C. and 150° C. conditions relative to the MOM-based films. These improved solubilities for the compounds with hydrocarbyl ligands having $R^1$ and/or $R^2$ groups with more than one carbon atom can improve the available process window of organotin photoresists and can enable higher processing temperatures and alternative developers.

Contrast

Figure 19:
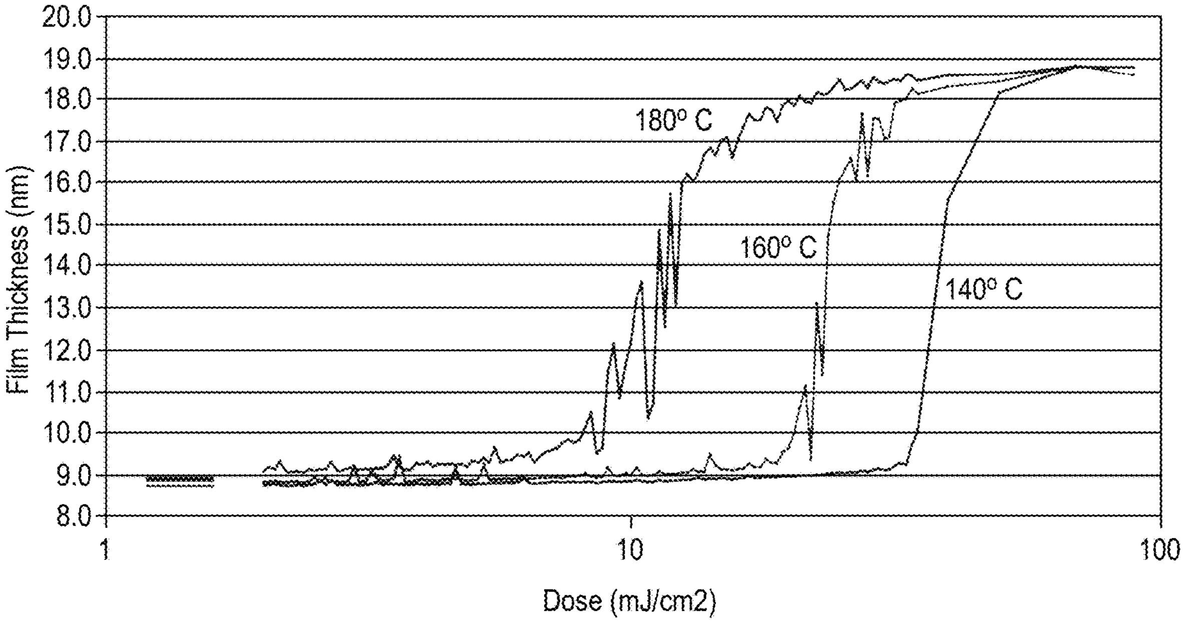
FIG. 19 is a set of contrast curves for films of tetrahydropyranyltin tris(tert-butyl oxide) prepared with three different post-exposure bake temperatures: 140° C., 160° C., and 180° C.

A 0.05 M [Sn] solution of THP-Sn-$(OtBu)_3$ was prepared by dissolving and thoroughly mixing appropriate masses of THP-Sn-$(OtBu)_3$ precursor in 4-methyl-2-pentanol comprising 300 ppm $H_2O$ as measured by Karl-Fisher titration. The precursor solutions were deposited onto spin-on-glass (SOG)-coated (10 nm) silicon wafers by spin coating to achieve a 24.0±0.4 nm dry film thickness. Following deposition and formation of the coating, the wafers were baked at 100° C. for 60 seconds. Exposure to patterned EUV radiation was conducted on an ASML NXE3400C EUV Scanner operating in an open frame to produce contrast arrays. The exposed samples were then baked at temperatures of 140° C., 160° C., and 180° C., and followed by development with a 5% acetic acid in PGMEA solution. Finally, the films were baked at 250° C. to eliminate developer residue and to densify the pattern. The thickness of each exposed pad was measured via ellipsometry and then plotted against dose to produce contrast curves in FIG. 19, with the data summarized in Table 5 below, where dose-to-gel (Dg) and dose at initial increase ($D_0$) are obtained from the plot.

TABLE 5

| Post-Exposure Bake Temp. (° C.) | Dg (mJ/cm$^2$) | $D_0$ (mJ/cm$^2$) | Contrast Value |
|---|---|---|---|
| 140 | 44.32 | 21.24 | 3.13 |
| 160 | 28.81 | 12.52 | 2.76 |
| 180 | 12.52 | 5.92 | 3.08 |

Example 4: Radiolysis-Induced Thermolysis

This example shows the improvements to carbon-loss during the post-exposure bake process for compositions comprising oxygen-substituted hydrocarbyl ligands. Three resist solutions were prepared using THP-Sn-$(OtBu)_3$ (Precursor 1), mTHP-Sn-$(OtBu)_3$ (Precursor 2), and n-butyl-Sn-$(OtAm)_3$ where OtAm is the alkoxide of tert-amyl alcohol. A solution comprising Precursor 1 in methyl iso-butyl carbinol (MIBC) was formulated at a [Sn] concentration of 0.04 M, and a solution comprising Precursor 2 in 1-propanol was formulated at a [Sn] concentration of 0.028 M. Due to the differences in viscosity and volatility, different concentrations were prepared in order to yield resist films having similar thicknesses after spin-coating. A Comparative Example comprising n-butyl-Sn-$(OtAm)_3$ formulated in MIBC at a [Sn] concentration of 0.05 M was also prepared.

The resist solutions were spin-coated at conditions to yield approximately 24 nm thick films. Following deposition, each wafer was subjected to a post-deposition bake at 100° C. for 60 seconds to complete drying of the samples. The wafers were then exposed using an ASML TwinScan NXE 3400 exposure tool by creating an array of open-frame exposure pads at different doses across the wafer. The wafers were then subjected to a post-exposure bake at 180° C. for 60 seconds. Following the post-exposure bake, each pad on each wafer was then analyzed using FTIR spectroscopy to measure the peak areas that correspond to the absorbance of the C—H stretch (the region from 2800 cm$^{-1}$ to 3000 cm$^{-1}$) to determine the amount of carbon remaining in each pad. The measured peak areas were then normalized to the peak areas of the non-exposed regions on the same wafer to calculate a relative peak area. The relative peak areas were then plotted vs. dose and are shown in FIG. 20.

Figure 20:
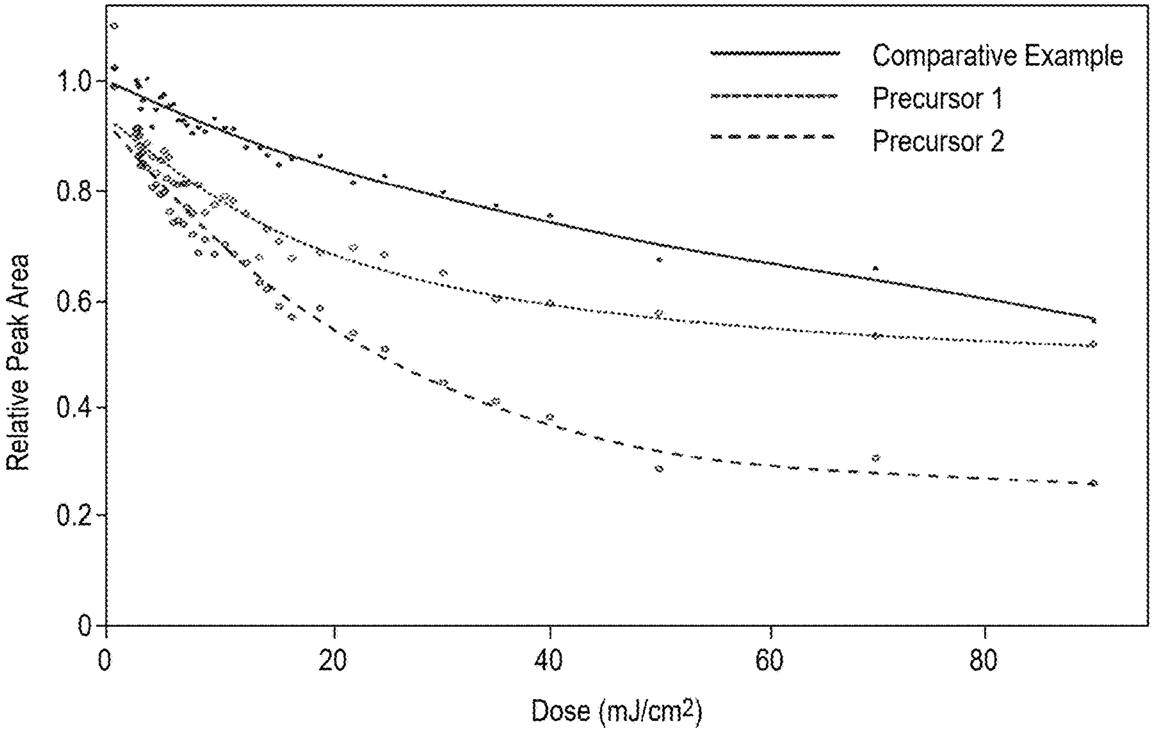
FIG. 20 is a plot of relative peak area as a function of dose, for films prepared with methyloxymethyltin tris(tert-butyl oxide), tetrahydropyranyltin tris(tert-butyl oxide) and 4-methyl-tetrahydropyranyltin tris(tert-butyl oxide).

As shown in FIG. 20, in all cases the peak area corresponding to C—H absorbance decreases with increasing dose. In other words, exposure to EUV radiation followed by baking leads to a loss in carbon content of the exposed area. For resist films deposited from Precursor 1 and Precursor 2, the amount of carbon lost after exposure and baking is greater than that of the Comparative Example. The rate of carbon loss as a function of dose (i.e., the decrease in relative peak area vs. dose) is much improved for resists prepared from Precursor 1 and Precursor 2, with the rate greatest for Precursor 2. For example, after a dose of 20 mJ/cm$^2$ and a 60 second bake at 180° C., approximately 70% of the carbon is remaining in Precursor 1 and approximately 55% remaining for Precursor 2. In contrast, about 85% of the carbon remains for the same conditions for the Comparative Example. In general, a higher rate of carbon loss indicates more efficient Sn—C bond cleavage after EUV exposure and post-exposure bake which, in turn, can translate to higher contrast, lower dose, and improved patterning.

Furthermore, the amount of carbon loss for resist films deposited from Precursor 2 was found to be the greatest. This result suggests that organotin resists having a tertiary C bound to the Sn and an oxygen in the hydrocarbyl ligand leads to improved rates of carbon loss.

Example 5: Blended Compositions

This example shows effects of dose (dose-to-size) on blended resist films when generating an image of a pattern having 16 nm lines on a 32 nm pitch. Blends 1-9 and a Comparative Blend were prepared with precursors listed in Table 6. Molar proportions and solvents used to prepare the blends are shown in Table 7.

TABLE 6

| Component | Precursor |
|---|---|
| A | tert-Butyl-Sn-$(OtAm)_3$ |
| B | Methyl-Sn-$(OtAm)_3$ |
| C | Ethyl-Sn-$(OtAm)_3$ |
| Compound 1 | THP-Sn-$(OtBu)_3$ |
| Compound 2 | mTHP-Sn-$(OtBu)_3$ |

TABLE 7

| Resist Blend | Composition | Solvent |
|---|---|---|
| Blend 1 | 65% A | 50% MIBC |
| | 15% C | 50% 1-propanol |
| | 20% Compound 1 | |
| Blend 2 | 65% A | 50% MIBC |
| | 25% C | 50% 1-propanol |
| | 10% Compound 1 | |
| Blend 3 | 70% A | 50% MIBC |
| | 10% B | 50% 1-propanol |
| | 20% Compound 1 | |
| Blend 4 | 70% A | 50% MIBC |
| | 20% B | 50% 1-propanol |
| | 10% Compound 1 | |
| Blend 5 | 80% A | 1-pentanol |
| | 20% Compound 2 | |
| Blend 6 | 75% A | 45% MIBC |
| | 15% B | 55% 1-propanol |
| | 10% Compound 2 | |
| Blend 7 | 65% A | 45% MIBC |
| | 15% B | 55% 1-propanol |
| | 20% Compound 2 | |
| Blend 8 | 70% A | 45% MIBC |
| | 20% B | 55% 1-propanol |
| | 10% Compound 2 | |
| Blend 9 | 60% A | 45% MIBC |
| | 20% B | 55% 1-propanol |
| | 20% Compound 2 | |
| Comparative Blend | 80% A | MIBC |
| | 20% B | |

Blends 1-9 and the Comparative Blend were then spin-coated onto 10-nm SOG-coated Si wafers and then subjected to a post-deposition bake of 100° C. for 60 seconds to form approximately 24 nm thick resist films. The resist-coated wafers were then exposed to EUV radiation on an ASML TwinScan NXE 3400 exposure tool by exposing an array of fields across each wafer at a different dose. Following EUV exposure, each wafer was then subjected to a post-exposure bake for 60 seconds at a temperature of 160° C., 170° C., 180° C., 190° C., or 200° C. and then developed using 5% acetic acid in PGMEA. The wafers were then hard baked at 250° C. for 60 seconds.

The dose-to-size (DtS) corresponding to 16 nm lines on a 32 nm pitch (16p32) was then determined by analyzing the wafers using a Hitachi CDSEM. The critical dimension (CD) of each 16p32 feature was measured and plotted versus the field's dose, and the DtS was interpolated. In some cases the DtS values lay outside of the conditions tested, and the corresponding DtS values were indicated to be below the minimum dosage tested. The results are shown in Table 8.

TABLE 8

| | Dose-to-Size (16p32, $mJ/cm^2$) Post exposure Bake Temperature | | | | |
|---|---|---|---|---|---|
| Resist Blend | 160° C. | 170° C. | 180° C. | 190° C. | 200° C. |
| Blend 1 | | 64.1 | 54 | 44.5 | 35.1 |
| Blend 2 | | 72.4 | 59.8 | 49.1 | 36.3 |
| Blend 3 | | 74.7 | 60.5 | 49.7 | 38.9 |
| Blend 4 | | 73 | 56.5 | 46.7 | 36.4 |
| Blend 5 | 68.9 | | 64.2 | 53.8 | 45.2 |
| Blend 6 | 70.6 | | 56 | 41.5 | 31.8 |
| Blend 7 | 65.7 | | 48.3 | 31.3 | <30 |
| Blend 8 | 70.2 | | 51.2 | 35.1 | <30 |
| Blend 9 | 65.6 | | 44.1 | <30 | <30 |
| Comparative Example | | | 58.9 | 47 | 39.6 |

Lower dose-to-size values than the Comparative Example were obtained from most blends comprising Compounds 1 and 2 at a 180° C. PEB relative to the control blend. At higher temperatures, much lower dose-to-size values were obtained.

Example 6: Non-Blended Compositions

To demonstrate the improved sensitivity of organotin resists having ether-based ligands, a direct comparison between the lithographic performance of resist films prepared from a cyclopentyl$Sn(OtAm)_3$ precursor and resist films prepared from a THP$Sn(OtBu)_3$ precursor was performed. The precursors were dissolved in MIBC to afford 0.05 M cyclopentyl$Sn(OtAm)_3$ and 0.04 M THP$Sn(OtBu)_3$. The samples were then spin-coated onto 10-nm SOG-coated Si wafers and then subjected to a post-application bake of 100° C. for 60 seconds to form approximately 24 nm thick resist films. The resist-coated wafers were then exposed to EUV radiation on an ASML TwinScan NXE 3400 exposure tool by exposing an array of fields across each wafer at a different dose. Following EUV exposure, each wafer was then subjected to a post-exposure bake at a temperature of 180° C. for 60 seconds and then developed using 5% acetic acid in PGMEA. The wafers were then hard baked at 250° C. for 60 seconds.

The dose-to-size (DtS) corresponding to 16 nm lines on a 32 nm pitch (16p32) was then determined by analyzing the wafers using a Hitachi CDSEM. The critical dimension (CD) of each 16p32 feature was measured and plotted versus the field's dose, and the DtS was interpolated. In some cases the DtS values lay outside of the conditions tested, and the corresponding DtS values were indicated to be below the minimum dosage tested. The results are shown in Table 9.

TABLE 9

| Resist $RSnL_3$ | Solvent | Dose-to-size (16p32, $mJ/cm^2$) |
|---|---|---|
| Cyclopentyl-Sn-$(OtAm)_3$ | MIBC | 88.8 |
| THP-Sn-$(OtBu)_3$ | MIBC | 44.9 |

As shown in Table 9, the presence of the oxygen atom within the alkyl group bound to the Sn corresponds to a much lower dose-to-size value than for a non-substituted cyclic alkyl group bound to the Sn.

Further Inventive Concepts

1. A radiation-patternable coated substrate comprising a substrate and a coating having an average thickness from about 1 nm to about 75 nm and represented by the formula $RSnO_n(OH)_{3-2n}$, forming an oxo-hydroxo network, where R is a hydrocarbyl ether group with 1 to 30 carbon atoms and 0<n<3/2, wherein regions of the coating are soluble in 2-heptanone in a puddle development step following a bake at 150° C. for 120 seconds.

2. The radiation-patternable coated substrate of inventive concept 1 wherein R— is an aromatic ether represented by the formula $Ar—O—(CR'_2)_m—$, where Ar is an aromatic organic moiety, m is an integer from 1 to 4; R' is a hydrogen or a hydrocarbyl group with 1 to 6 carbon atoms and optional heteroatoms.

3. The radiation-patternable coated substrate of inventive concept 2 wherein m is 1, R' is hydrogen, and Ar is $—C_6H_5$.

4. The radiation-patternable coated substrate of inventive concept 1 wherein R is a cyclic ether represented by the formula cyclic($O(CR'_2)_nCR'R^0—$), where R' is a hydrogen or a hydrocarbyl group with 1 to 6 carbon atoms and optional heteroatoms, n is an integer from 1 to 8, optionally a $CR'_2$ group can be replaced with an 0 to form a cyclic polyether, and two R' groups can combine to form a polycyclic structure; $R^0$ is a bond or a linear or branched hydrocarbyl group with 1 to 5 carbon atoms and optional heteroatoms.

5. The radiation-patternable coated substrate of inventive concept 4 wherein $R^0$ is a bond, the cyclic ether is directly bonded to the Sn atom, and $O(CR''_2)_nCR'$ is $O(CH_2)_3CH—$, $O(CH_2)_4CH—$ or $O(CH_2)_4CCH_3—$.

6. The radiation-patternable coated substrate of inventive concept 1 wherein R is a halogenated ether represented by the formula $R^1OR^0C(R^2R^3)—$, $R^0$ is a bond or a linear or branched hydrocarbyl group with 1 to 5 carbon atoms and optional heteroatoms, $R^1$ is a hydrocarbyl group with 1 to 10 carbon atoms, with optional unsaturated bonds and/or optional hetero atoms, $R^2$ and $R^3$ are independently hydrogen, halogen or hydrocarbyl groups with 1 to 7 carbon atoms, with optional unsaturated bonds and/or optional heteroatoms and wherein at least one of $R^1$, $R^2$, $R^3$ have a halogen atom.

7. The radiation-patternable coated substrate of inventive concept 6 wherein $R^1$ or $R^2$ comprises $—CF_3$.

8. The radiation-patternable coated substrate of inventive concept 1 wherein R is a polyether represented by the formula R1R2R3C—, wherein R1, R2, and R3 are independently hydrocarbyl groups with 1 to 19 carbon atoms, with optional unsaturated bonds and/or optional heteroatoms, at least two of R1, R2, R3 are ether moieties or at least one of R1, R2, R3 is a diether moiety.

9. A method of patterning a structure, the method comprising:

irradiating the radiation-patternable coated substrate of inventive concept 1 to form a latent image; and developing the latent image to form a physical pattern.

A1. A method for patterning a substrate, the method comprising:

irradiating a substrate with an organotin coating with patterned EUV radiation to form a latent image, wherein the coating has an average thickness from about 1 nm to about 75 nm and a composition represented by the formula $RSnO_n(OH)_{3-2n}$, forming an oxo-hydroxo network, where R is a hydrocarbyl ether group with 1 to 30 carbon atoms and $0<n<3/2$ developing the latent image with a developer solvent to remove the unirradiated coating to form a developed image to form an image with a critical dimension of no more than about 50 nm and a dose of no more than about 80 $mJ/cm^2$.

A2. The method of inventive concept A1 wherein the polar organic developer solvent comprises a solvent blend comprising at least two solvents with at least 55 volume % of one or more solvents each independently having a sum of Hansen solubility parameter $\delta H+\delta P$ of no more than about 16 $(J/cm^3)^{1/2}$, and with from about 0.25 volume % to about 45 volume % of one or more solvents each independently having a sum of Hansen solubility parameter $\delta H+\delta P$ of at least about 16 $(J/cm^3)^{1/2}$.

A3. The method of inventive concept A1 wherein the organotin coating is formed by:

A) contacting a substrate surface with a vapor of an organotin composition to form a deposit on the substrate surface; and heating the substrate with the deposit on the surface, wherein the conditions for contacting and/or heating provide for the hydrolysis of the hydrolysable ligands, L, to for a coating comprising $RSnO_n(OH)_{3-2n}$, forming an oxo-hydroxo network, where $0<n<3/2$; or B) depositing onto a substrate surface, a solution comprising an organic solvent and an organotin composition at a concentration from about 0.0025 M to about 1.4 M measured based on tin cation concentration to form an initial coated surface; and heating the substrate with the initial coated surface, wherein the conditions for depositing and/or heating provide for the hydrolysis of the hydrolysable ligands, L, to for a coating comprising $RSnO_n(OH)_{3-2n}$, forming an oxo-hydroxo network, where $0<n<3/2$.

A4. The method of inventive concept A1 wherein the heating the substrate with the initial coated surface is performed at a temperature from about 50° C. to about 250° C. for a time from about 0.1 minutes to about 10 minutes.

A5. The method of inventive concept A1 further comprising heating the substrate with the latent image to a temperature from about 50° C. to about 250° C. for a time from about 0.1 minutes to about 10 minutes.

A6. The method of inventive concept A1 wherein R— is an aromatic ether represented by the formula $Ar—O—(CR'_2)_m—$, where Ar is an aromatic organic moiety, m is an integer from 1 to 4; R' is a hydrogen or a hydrocarbyl group with 1 to 6 carbon atoms and optional heteroatoms.

A7. The method of inventive concept A6 wherein m is 1, R' is hydrogen, and Ar is $—C_6H_5$.

A8. The method of inventive concept A1 wherein R is a cyclic ether represented by the formula cyclic($O(CR'_2)_nCR'R^0—$), where R' is a hydrogen or a hydrocarbyl group with 1 to 6 carbon atoms and optional heteroatoms, n is an integer from 1 to 8, optionally a $CR'_2$ group can be replaced with an O to form a cyclic polyether, and two R' groups can combine to form a polycyclic structure; $R^0$ is a bond or a linear or branched hydrocarbyl group with 1 to 5 carbon atoms and optional heteroatoms.

A9. The method of inventive concept A8 wherein $R^0$ is a bond, the cyclic ether is directly bonded to the Sn atom, and $O(CR''_2)_nCR'$ is $O(CH_2)_3CH—$, $O(CH_2)_4CH—$ or $O(CH_2)_4CCH_3—$.

A10. The method of inventive concept A1 wherein R is a halogenated ether represented by the formula $R^1OR^0C(R^2R^3)—$, $R^0$ is a bond or a linear or branched hydrocarbyl group with 1 to 5 carbon atoms and optional heteroatoms, $R^1$ is a hydrocarbyl group with 1 to 10 carbon atoms, with optional unsaturated bonds and/or optional hetero atoms, $R^2$ and $R^3$ are independently hydrogen, halogen or hydrocarbyl groups with 1 to 7 carbon atoms, with optional unsaturated bonds and/or optional heteroatoms and wherein at least one of $R^1$, $R^2$, $R^3$ have a halogen atom.

A11. The method of inventive concept A1 A10 wherein $R^1$ or $R^2$ comprises $—CF_3$.

A12. The method of inventive concept A1 A1 wherein R is a polyether represented by the formula R1R2R3C—, wherein R1, R2, and R3 are independently hydrocarbyl groups with 1 to 19 carbon atoms, with optional unsaturated bonds and/or optional heteroatoms, at least two of R1, R2, R3 are ether moieties or at least one of R1, R2, R3 is a diether moiety.

B1. A method for synthesizing an organotin composition, the method comprising:

reacting a halide hydrocarbyl compound (R-X, where X is a halide atom) with an organometallic composition comprising $SnL_3$ moieties associated with metal cations M to form the alkali metal tin composition, where M is an alkali metal, alkaline earth metal, and/or pseudo-alkaline earth metal (Zn, Cd, or Hg), and L is either an amide ligand resulting in an alkali metal tin triamide compound or an acetylide ligand resulting in an alkali metal tin triacetylide compound, to form correspondingly a monohydrocarbyl tin triamide ($RSn(NR'_2)_3$) or a monohydrocarbyl tin triacetylide ($RSn(C≡CR^s)_3$), $R^s$ is $SiR''_3$ or R', the three R'' are independently H or R', and the R' are independently a hydrocarbyl group with from 1 to 31 carbon atoms and optional unsaturated carbon-carbon bonds, optional aromatic groups and optional hetero atoms, and where R is a hydrocarbyl ether group with from 1 to 31 carbon atoms and optional unsaturated carbon-carbon bonds, optional aromatic groups and optional hetero atoms comprising an aromatic ether represented by the formula $Ar—O—(CR'_2)_m—$, or a cyclic ether represented by the formula cyclic($O(CR'_2)_nCR'—$), or a polyether represented by the formula R1R2R3C—, where Ar is an aromatic organic group, m is an integer from 1 to 4, each R' is a hydrogen, a halogen, or a hydrocarbyl group with 1 to 6 carbon atoms and optional heteroatoms, n is an integer from 1 to 8, R1, R2, and R3 are independently hydrocarbyl groups with 1 to 19 carbon atom, at least two of R1, R2, R3 are ether moieties or at least one of R1, R2, R3 is a diether moiety.

B2. The method of inventive concept B1 wherein the method produces the organotin composition of any one of claims 1-15.

C1. A method to form an organotin composition, the method comprising, reacting an alkylating agent selected from the group consisting of RMgX, $R_2Zn$, $RZnNR'_2$, or a combination thereof, with $Sn(NR'_2)_4$ in a solution comprising an organic solvent, wherein X is a halogen, wherein R' is a hydrocarbyl group with 1-10 carbon atoms, and wherein R is a hydrocarbyl ether group with from 1 to 31 carbon atoms and optional unsaturated carbon-carbon bonds, optional aromatic groups and optional hetero atoms comprising an aromatic ether represented by the formula Ar—O—$(CR'_2)_m$—, or a cyclic ether represented by the formula cyclic(O$(CR'_2)_n$CR'—), or a polyether represented by the formula R1R2R3C—, where Ar is an aromatic organic group, m is an integer from 1 to 4, each R' is a hydrogen, a halogen, or a hydrocarbyl group with 1 to 6 carbon atoms and optional heteroatoms, n is an integer from 1 to 8, R1, R2, and R3 are independently hydrocarbyl groups with 1 to 19 carbon atom, at least two of R1, R2, R3 are ether moieties or at least one of R1, R2, R3 is a diether moiety.

C2. The method of inventive concept C1 wherein the method produces the organotin composition of any one of claims 1-15.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated. The use of the term "about" herein refers to expected uncertainties in the associated values as would be understood in the particular context by a person of ordinary skill in the art.

What is claimed is:

1. An organotin composition represented by the formula $RSnL_3$, where L is a hydrolysable ligand and R— is A) an aromatic ether represented by the formula Ar—O—$(CR'_2)_m$—, or B) R is a cyclic ether represented by the formula cyclic(O$(CR''_2)_n$CR'$R^0$—), or C) R is a halogenated ether represented by the formula $R^1OR^0C(R^2R^3)$—, or D) R is a polyether represented by the formula R1R2R3C—, where Ar is an aromatic organic moiety; m is an integer from 1 to 4; R' is a hydrogen or a hydrocarbyl group with 1 to 6 carbon atoms and optional heteroatoms; n is an integer from 1 to 8; R'' is a hydrogen or hydrocarbyl group with 1 to 4 carbon atoms and optional heteroatoms; optionally a $CR''_2$ group can be replaced with an O to form a cyclic polyether, and two R'' groups can combine to form a polycyclic structure; $R^0$ is a bond or a hydrocarbyl group with 1 to 5 carbon atoms and optional heteroatoms; $R^1$ is a hydrocarbyl group with 1 to 10 carbon atoms, with optional unsaturated bonds and/or optional hetero atoms; $R^2$ and $R^3$ are independently hydrogen, halogen or hydrocarbyl groups with 1 to 7 carbon atoms, with optional unsaturated bonds and/or optional heteroatoms, wherein at least one of $R^1$, $R^2$, $R^3$ have a halogen atom; and R1, R2, and R3 are independently hydrocarbyl groups with 1 to 19 carbon atoms, with optional unsaturated bonds and/or optional heteroatoms, at least two of R1, R2, R3 are ether moieties or at least one of R1, R2, R3 is a diether moiety.

2. The organotin composition of claim 1 wherein R— is an aromatic ether represented by the formula Ar—O—$(CR'_2)_m$—, where Ar is an aromatic organic moiety, m is an integer from 1 to 4; R' is a hydrogen or a hydrocarbyl group with 1 to 6 carbon atoms and optional heteroatoms.

3. The organotin composition of claim 2 wherein m is 1 and R' is hydrogen.

4. The organotin composition of claim 3 wherein Ar is —$C_6H_5$.

5. The organotin composition of claim 1 wherein R— is an aromatic ether represented by the formula Ar—O—$(CR'_2)_m$—, where Ar is —$C_5NH_4$, —$C_{10}H_7$, —$CH_2C_6H_5$, or —$C_6H_4C_6H_5$.

6. The organotin composition of claim 1 wherein R is a cyclic ether represented by the formula cyclic (O$(CR'_2)_n$CR'$R^0$—), where R' is a hydrogen or a hydrocarbyl group with 1 to 6 carbon atoms and optional heteroatoms, n is an integer from 1 to 8, optionally a $CR'_2$ group can be replaced with an O to form a cyclic polyether, and two R' groups can combine to form a polycyclic structure; $R^0$ is a bond or a linear or branched hydrocarbyl group with 1 to 5 carbon atoms and optional heteroatoms.

7. The organotin composition of claim 6 wherein R is represented by O$(CR'_2)_n$CR'$R^0$— and $R^0$ is a bond and the cyclic ether is directly bonded to the Sn atom.

8. The organotin composition of claim 7 wherein O$(CR'_2)_n$CR' is $O(CH_2)_3CH$—, $O(CH_2)_4CH$— or $O(CH_2)_4CCH_3$—.

9. The organotin composition of claim 6 wherein at least one $CR'_2$ group is replaced by an oxygen atom such that the cyclic ether is a polyether.

10. The organotin composition of claim 6 wherein O$(CR'_2)_n$CR'$R^0$— is cyclic ($CH_2OCH_2OCH_2CH$)—.

11. The organotin composition of claim 1 wherein R is a halogenated ether represented by the formula $R^1OR^0C(R^2R^3)$—, $R^0$ is a bond or a linear or branched hydrocarbyl group with 1 to 5 carbon atoms and optional heteroatoms, $R^1$ is a hydrocarbyl group with 1 to 10 carbon atoms, with optional unsaturated bonds and/or optional hetero atoms, $R^2$ and $R^3$ are independently hydrogen, halogen or hydrocarbyl groups with 1 to 7 carbon atoms, with optional unsaturated bonds and/or optional heteroatoms and wherein at least one of $R^1$, $R^2$, $R^3$ have a halogen atom.

12. The organotin composition of claim 11 wherein $R^1$ or $R^2$ comprises —$CF_3$.

13. The organotin composition of claim 11 wherein $R^0$ is a bond and $R^2$ and/or $R^3$ comprises a fluorine group.

14. The organotin composition of claim 1 wherein R is a polyether represented by the formula R1R2R3C—, wherein R1, R2, and R3 are independently hydrocarbyl groups with 1 to 19 carbon atoms, with optional unsaturated bonds and/or optional heteroatoms, at least two of R1, R2, R3 are ether moieties or at least one of R1, R2, R3 is a diether moiety.

15. The organotin composition of claim 14 wherein R1 is $—OCH_3$, R2 is $OCH_3$ and R3 is hydrogen.

16. The organotin composition of claim 14 wherein R1 comprises $—OCH_2OCH_3$.

17. A solution comprising an organic solvent and a tin composition of claim 1 at a concentration from about 0.0025 M to about 1.4 M measured based on tin cation concentration.

18. The solution of claim 17 wherein the organic solvent comprises a secondary or tertiary alcohol with from 3 to 8 carbon atoms.

19. The solution of claim 17 further comprising a second distinct tin composition of claim 1.

20. The solution of claim 17 further comprising a tin composition represented by the formula $R^aSnL'_3$, where L' is a hydrolysable ligand that is the same or different from L and $R^a$ is represented by the formula $R^bR^cR^dC—$, where $R^b$, $R^c$, $R^d$ are independently hydrogen or a linear or branched alkyl group with 1 to 4 carbon atoms.

21. The solution of claim 20 wherein $R^b$, $R^c$, $R^d$ are each a $—CH_3$ group.

22. The solution of claim 17 wherein the tin composition of claim 1 has an R group that is an aromatic ether represented by the formula $Ar—O—(CR'_2)_m—$.

23. The solution of claim 17 wherein the tin composition of claim 1 has an R group that is a cyclic ether represented by the formula cyclic($O(CR''_2)_nCR'R^0—$).

24. The solution of claim 23 wherein $R^0$ is a bond, the cyclic ether is directly bonded to the Sn atom, and $O(CR''_2)_nCR'$ is $O(CH_2)_3CH—$, $O(CH_2)_4CH—$ or $O(CH_2)_4CCH_3—$.

25. A method of forming a radiation-patternable coated substrate, the method comprising:

A) contacting a substrate surface with a vapor of the composition of claim 1 to form a deposit on the substrate surface; and heating the substrate with the deposit on the surface, wherein the conditions for contacting and/or heating provide for the hydrolysis of the hydrolysable ligands, L, to for a coating comprising $RSnO_n(OH)_{3-2n}$, forming an oxo-hydroxo network, where $0<n<3/2$; or B) depositing onto a substrate surface, a solution comprising an organic solvent and a tin composition of claim 1 at a concentration from about 0.0025 M to about 1.4 M measured based on tin cation concentration to form an initial coated surface; and heating the substrate with the initial coated surface, wherein the conditions for depositing and/or heating provide for the hydrolysis of the hydrolysable ligands, L, to for a coating comprising $RSnO_n(OH)_{3-2n}$, forming an oxo-hydroxo network, where $0<n<3/2$.

26. A radiation-patternable coated substrate comprising a substrate and a coating having an average thickness from about 1 nm to about 75 nm and represented by the formula $RSnO_n(OH)_{3-2n}$, forming an oxo-hydroxo network, where R is a hydrocarbyl ether group with 1 to 30 carbon atoms and $0<n<3/2$, wherein regions of the coating are soluble in 2-heptanone in a puddle development step following a bake at 150° C. for 120 seconds.

* * * * *